(12) United States Patent
Wilson et al.

(10) Patent No.: US 12,124,682 B2
(45) Date of Patent: Oct. 22, 2024

(54) STOPWATCH AND TIMER USER INTERFACES

(71) Applicant: Apple Inc., Cupertino, CA (US)

(72) Inventors: Eric Lance Wilson, San Jose, CA (US); Christopher Wilson, San Francisco, CA (US); Jonathan R. Dascola, San Francisco, CA (US); Gary Ian Butcher, San Jose, CA (US); Imran Chaudhri, San Francisco, CA (US); Alan C. Dye, San Francisco, CA (US); Stephen O. Lemay, Palo Alto, CA (US); Natalia Maric, San Francisco, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/370,351

(22) Filed: Sep. 19, 2023

(65) Prior Publication Data
US 2024/0004530 A1     Jan. 4, 2024

Related U.S. Application Data

(63) Continuation of application No. 17/728,801, filed on Apr. 25, 2022, now Pat. No. 11,775,150, which is a
(Continued)

(51) Int. Cl.
*G06F 3/0484*     (2022.01)
*G04F 10/00*     (2006.01)
(Continued)

(52) U.S. Cl.
CPC ............ *G06F 3/0484* (2013.01); *G04F 10/00* (2013.01); *G06F 3/0481* (2013.01);
(Continued)

(58) Field of Classification Search
CPC .. G06F 3/0484; G06F 3/0481; G06F 3/04842; G06F 3/0485
See application file for complete search history.

(56) References Cited

U.S. PATENT DOCUMENTS

| | | |
|---|---|---|
| 5,297,110 A | 3/1994 | Ohira et al. |
| 5,795,301 A | 8/1998 | Nakamura et al. |

(Continued)

FOREIGN PATENT DOCUMENTS

| | | |
|---|---|---|
| AU | 2012200689 A1 | 3/2012 |
| CN | 104956276 A | 9/2015 |

(Continued)

OTHER PUBLICATIONS

Corrected Notice of Allowance received for U.S. Appl. No. 17/019,845, mailed on Aug. 7, 2023, 4 pages.
(Continued)

*Primary Examiner* — Mong-Shune Chung
(74) *Attorney, Agent, or Firm* — DLA Piper LLP (US)

(57) ABSTRACT

An electronic device may display a first lap time representation, and may move the first lap time representation in accordance with a first amount of elapsed time. While moving the first lap time representation, the electronic device may detect a lap input. In response to the lap input, the electronic device may cease movement of the first lap time representation, display a second lap time representation, and move the second lap time representation in accordance with a second amount of elapsed time. A relative positioning of the first lap time representation and the second lap time representation may correspond to a difference between a first lap time and a second lap time. In some embodiments, the electronic device may update the timescales of lap time representation(s) in accordance with a rotational input. In some embodiments, the electronic device (Continued)

may update a timer duration setting in accordance with a rotational input.

30 Claims, 48 Drawing Sheets

Related U.S. Application Data continuation of application No. 16/715,928, filed on Dec. 16, 2019, now Pat. No. 11,314,392, which is a continuation of application No. 14/752,662, filed on Jun. 26, 2015, now Pat. No. 10,552,009.

(60) Provisional application No. 62/129,825, filed on Mar. 7, 2015, provisional application No. 62/044,979, filed on Sep. 2, 2014.

(51) Int. Cl.
| | | |
|---|---|---|
| *G06F 3/0481* | (2022.01) | |
| *G06F 3/04817* | (2022.01) | |
| *G06F 3/0482* | (2013.01) | |
| *G06F 3/04842* | (2022.01) | |
| *G06F 3/0485* | (2022.01) | |
| *G06F 3/0488* | (2022.01) | |
| *G06F 3/04883* | (2022.01) | |
| *G07C 1/22* | (2006.01) | |
| *G07C 1/24* | (2006.01) | |

(52) U.S. Cl.
CPC ........ *G06F 3/04817* (2013.01); *G06F 3/0482* (2013.01); *G06F 3/04842* (2013.01); *G06F 3/0485* (2013.01); *G06F 3/0488* (2013.01); *G06F 3/04883* (2013.01); *G07C 1/22* (2013.01); *G07C 1/24* (2013.01); *H04M 2250/22* (2013.01)

(56) References Cited

U.S. PATENT DOCUMENTS

| | | | |
|---|---|---|---|
| 6,140,987 A | 10/2000 | Stein et al. | |
| 7,075,513 B2 | 7/2006 | Silfverberg et al. | |
| 7,710,409 B2 | 5/2010 | Robbin et al. | |
| 7,730,223 B1 | 6/2010 | Bavor et al. | |
| 8,201,102 B2 | 6/2012 | Lee et al. | |
| 8,234,395 B2 | 7/2012 | Millington | |
| 9,020,538 B1 | 4/2015 | White et al. | |
| 9,582,178 B2 | 2/2017 | Grant et al. | |
| 9,680,982 B2 | 6/2017 | Fiedler | |
| 9,696,809 B2 | 7/2017 | Temple | |
| 10,055,094 B2 | 8/2018 | Li et al. | |
| 10,142,122 B1 | 11/2018 | Hill et al. | |
| 10,237,141 B2 | 3/2019 | Sasaki et al. | |
| 10,284,980 B1 | 5/2019 | Woo et al. | |
| 10,303,422 B1 | 5/2019 | Woo et al. | |
| 10,310,725 B2 | 6/2019 | Smith et al. | |
| 10,436,977 B2 | 10/2019 | Bergman et al. | |
| 10,454,781 B2 | 10/2019 | Sasaki et al. | |
| 10,511,456 B2 | 12/2019 | Smith et al. | |
| 10,779,085 B1 | 9/2020 | Carrigan | |
| 2001/0043514 A1 | 11/2001 | Kita et al. | |
| 2002/0118605 A1 | 8/2002 | Born et al. | |
| 2003/0081507 A1 | 5/2003 | Kitazawa et al. | |
| 2004/0218472 A1 | 11/2004 | Narayanaswami et al. | |
| 2005/0135198 A1* | 6/2005 | Wellen .................. | G04G 21/00 368/230 |
| 2005/0162423 A1 | 7/2005 | Goggin | |
| 2006/0136173 A1 | 6/2006 | Case, Jr. et al. | |
| 2007/0165553 A1 | 7/2007 | Steinmann | |
| 2008/0074958 A1 | 3/2008 | Moran | |
| 2008/0163116 A1 | 7/2008 | Lee et al. | |
| 2008/0168349 A1 | 7/2008 | Lamiraux et al. | |
| 2009/0046110 A1 | 2/2009 | Sadler et al. | |
| 2009/0070705 A1 | 3/2009 | Ording | |
| 2009/0153289 A1 | 6/2009 | Hope et al. | |
| 2010/0064255 A1 | 3/2010 | Rottler et al. | |
| 2010/0073692 A1 | 3/2010 | Waltman et al. | |
| 2010/0079500 A1 | 4/2010 | Osullivan et al. | |
| 2010/0229130 A1 | 9/2010 | Edge et al. | |
| 2010/0318917 A1 | 12/2010 | Holladay et al. | |
| 2011/0003665 A1 | 1/2011 | Burton et al. | |
| 2011/0071656 A1 | 3/2011 | Mckiel, Jr. | |
| 2011/0170379 A1* | 7/2011 | Eylon-Azoulay ...... | G04B 19/08 368/15 |
| 2011/0193878 A1 | 8/2011 | Seo et al. | |
| 2011/0255379 A1* | 10/2011 | Vidal .................... | G04G 9/047 368/70 |
| 2011/0275940 A1 | 11/2011 | Nims et al. | |
| 2012/0032988 A1 | 2/2012 | Katayama et al. | |
| 2012/0066632 A1 | 3/2012 | Sundermeyer et al. | |
| 2012/0169776 A1 | 7/2012 | Rissa et al. | |
| 2012/0236037 A1 | 9/2012 | Lessing et al. | |
| 2012/0269361 A1 | 10/2012 | Bhow et al. | |
| 2012/0274508 A1* | 11/2012 | Brown ............... | A63B 24/0062 342/357.57 |
| 2012/0304113 A1 | 11/2012 | Patten et al. | |
| 2013/0027412 A1* | 1/2013 | Roddy ................ | G06F 3/04847 345/501 |
| 2013/0113822 A1 | 5/2013 | Putrevu et al. | |
| 2013/0141378 A1 | 6/2013 | Yumiki et al. | |
| 2013/0283161 A1 | 10/2013 | Reimann et al. | |
| 2013/0326401 A1 | 12/2013 | Van et al. | |
| 2014/0087685 A1* | 3/2014 | Kellond .................. | G06F 3/041 345/173 |
| 2014/0143678 A1 | 5/2014 | Mistry et al. | |
| 2014/0172136 A1 | 6/2014 | Ura et al. | |
| 2014/0236325 A1 | 8/2014 | Sasaki et al. | |
| 2014/0282132 A1 | 9/2014 | Daly et al. | |
| 2014/0288680 A1 | 9/2014 | Hoffman et al. | |
| 2014/0328147 A1 | 11/2014 | Yang et al. | |
| 2014/0363024 A1 | 12/2014 | Apodaca | |
| 2014/0380234 A1 | 12/2014 | Shim et al. | |
| 2015/0081072 A1 | 3/2015 | Kallai et al. | |
| 2015/0212705 A1 | 7/2015 | Sasaki et al. | |
| 2015/0234562 A1 | 8/2015 | Ording | |
| 2015/0253735 A1 | 9/2015 | Watterson | |
| 2015/0256957 A1 | 9/2015 | Kim et al. | |
| 2015/0319046 A1 | 11/2015 | Plummer et al. | |
| 2015/0378320 A1* | 12/2015 | Knight .................. | G04G 15/00 368/107 |
| 2016/0004499 A1 | 1/2016 | Kim et al. | |
| 2016/0043962 A1 | 2/2016 | Kim et al. | |
| 2016/0062582 A1 | 3/2016 | Wilson et al. | |
| 2016/0070244 A1 | 3/2016 | Cipollo et al. | |
| 2016/0073197 A1 | 3/2016 | Hammer et al. | |
| 2016/0073482 A1 | 3/2016 | Fok et al. | |
| 2016/0092072 A1 | 3/2016 | So et al. | |
| 2016/0139752 A1 | 5/2016 | Shim et al. | |
| 2016/0173318 A1 | 6/2016 | Ha et al. | |
| 2016/0253145 A1 | 9/2016 | Lee et al. | |
| 2016/0259530 A1 | 9/2016 | Everitt et al. | |
| 2016/0320849 A1 | 11/2016 | Koo | |
| 2016/0357420 A1 | 12/2016 | Chen et al. | |
| 2016/0366481 A1 | 12/2016 | Lim et al. | |
| 2017/0017531 A1 | 1/2017 | Choi et al. | |
| 2017/0046025 A1 | 2/2017 | Dascola et al. | |
| 2017/0206779 A1 | 7/2017 | Lee et al. | |
| 2017/0251314 A1 | 8/2017 | Pye et al. | |
| 2017/0285788 A1 | 10/2017 | Park et al. | |
| 2017/0357425 A1 | 12/2017 | Smith et al. | |
| 2017/0357434 A1 | 12/2017 | Coffman et al. | |
| 2017/0359189 A1 | 12/2017 | Smith et al. | |
| 2019/0056907 A1 | 2/2019 | So et al. | |
| 2020/0117329 A1 | 4/2020 | Wilson et al. | |
| 2020/0382332 A1 | 12/2020 | Carrigan et al. | |
| 2020/0413197 A1 | 12/2020 | Carrigan et al. | |

(56) References Cited

U.S. PATENT DOCUMENTS

| | | |
|---|---|---|
| 2022/0357825 A1 | 11/2022 | Wilson et al. |
| 2023/0403509 A1 | 12/2023 | Carrigan et al. |

FOREIGN PATENT DOCUMENTS

| | | | |
|---|---|---|---|
| CN | 105374192 A | 3/2016 | |
| CN | 105474580 A | 4/2016 | |
| CN | 105900376 A | 8/2016 | |
| CN | 107533368 A | 1/2018 | |
| CN | 107819928 A | 3/2018 | |
| CN | 109117078 A | 1/2019 | |
| CN | 109196825 A | 1/2019 | |
| CN | 109287140 A | 1/2019 | |
| CN | 109302531 A | 2/2019 | |
| CN | 109348052 A | 2/2019 | |
| CN | 109688441 A | 4/2019 | |
| CN | 109688442 A | 4/2019 | |
| EP | 1637969 A2 | 3/2006 | |
| EP | 3038427 A1 | 6/2016 | |
| EP | 3445058 A1 | 2/2019 | |
| EP | 3038427 B1 | 12/2019 | |
| JP | 2004-96397 A | 3/2004 | |
| JP | 2013-200879 A | 10/2013 | |
| JP | 2017-41008 A | 2/2017 | |
| KR | 10-2014-0148289 A | 12/2014 | |
| KR | 10-2017-0008601 A | 1/2017 | |
| KR | 10-2017-0100358 A | 9/2017 | |
| KR | 10-2018-0034637 A | 4/2018 | |
| KR | 10-2019-0002658 A | 1/2019 | |
| KR | 10-2019-0014495 A | 2/2019 | |
| KR | 10-2019-0057414 A | 5/2019 | |
| WO | 03/021568 A1 | 3/2003 | |
| WO | 2008/004772 A1 | 1/2008 | |
| WO | 2008/030976 A2 | 3/2008 | |
| WO | 2011/027964 A1 | 3/2011 | |
| WO | 2014/128800 A1 | 8/2014 | |
| WO | 2014/189197 A1 | 11/2014 | |
| WO | 2014/200766 A1 | 12/2014 | |
| WO | 2015/008409 A1 | 1/2015 | |
| WO | 2015/114690 A1 | 8/2015 | |
| WO | 2017/027526 A1 | 2/2017 | |
| WO | 2017/058293 A1 | 4/2017 | |
| WO | 2017/147081 A1 | 8/2017 | |
| WO | 2017/218143 A1 | 12/2017 | |
| WO | 2017/218192 A1 | 12/2017 | |
| WO | 2018/144339 A2 | 8/2018 | |
| WO | 2018/213401 A1 | 11/2018 | |

OTHER PUBLICATIONS

Office Action received for Korean Patent Application No. 10-2022-7001521, mailed on Dec. 19, 2023, 7 pages (3 pages of English Translation and 4 pages of Official Copy).

Office Action received for Australian Patent Application No. 2023203357, mailed on Feb. 14, 2024, 3 pages.

Office Action received for Japanese Patent Application No. 2023-022576, mailed on Feb. 26, 2024, 10 pages (5 pages of English Translation and 5 pages of Official Copy).

Notice of Allowance received for Korean Patent Application No. 10-2022-7001521, mailed on Mar. 22, 2024, 7 pages (2 pages of English Translation and 5 pages of Official Copy).

Office Action received for European Patent Application No. 20719301.2, mailed on Oct. 20, 2023, 11 pages.

Advisory Action received for U.S. Appl. No. 14/752,662, mailed on Oct. 5, 2018, 3 pages.

Advisory Action received for U.S. Appl. No. 14/841,646, mailed on Nov. 21, 2018, 5 pages.

Advisory Action received for U.S. Appl. No. 14/868,757, mailed on Jan. 17, 2019, 5 pages.

Applicant-Initiated Interview Summary received for U.S. Appl. No. 16/584,743, mailed on May 1, 2020, 5 pages.

Applicant-Initiated Interview Summary received for U.S. Appl. No. 16/586,002, mailed on Apr. 28, 2020, 5 pages.

Applicant-Initiated Interview Summary received for U.S. Appl. No. 16/715,928, mailed on Mar. 15, 2021, 4 pages.

Applicant-Initiated Interview Summary received for U.S. Appl. No. 16/715,928, mailed on Nov. 1, 2021, 5 pages.

Applicant-Initiated Interview Summary received for U.S. Appl. No. 17/728,801, mailed on Dec. 16, 2022, 4 pages.

Being Tech Sawy, "A Simple Timer App for Android", Online available at: <URL: https://www.beingtechsawy.com/simple-minimal-timer-app-for-android/8542/>, Mar. 8, 2013, p. 1-2.

Benjamin, Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.

Corrected Notice of Allowance received for U.S. Appl. No. 16/584,743, mailed on Dec. 30, 2020, 3 pages.

Decision to Grant received for European Patent Application No. 15782209.9, mailed on Feb. 14, 2019, 2 pages.

Extended European Search Report received for European Patent Application No. 21160991.2, mailed on Jul. 16, 2021, 14 pages.

Final Office Action received for U.S. Appl. No. 14/752,662, mailed on Jun. 21, 2018, 15 pages.

Final Office Action received for U.S. Appl. No. 14/752,662, mailed on May 20, 2019, 18 pages.

Final Office Action received for U.S. Appl. No. 14/841,646, mailed on Aug. 2, 2018, 22 pages.

Final Office Action received for U.S. Appl. No. 14/868,757, mailed on Sep. 20, 2018, 18 pages.

Final Office Action received for U.S. Appl. No. 16/715,928, mailed on Jun. 29, 2021, 26 pages.

Intention to Grant received for European Patent Application No. 15782209.9, mailed on Sep. 28, 2018, 8 pages.

International Preliminary Report on Patentability received for PCT Patent Application No. PCT/US2015/038161, mailed on Mar. 16, 2017, 9 pages.

International Preliminary Report on Patentability received for PCT Patent Application No. PCT/US2015/054310, mailed on Sep. 14, 2017, 7 pages.

International Preliminary Report on Patentability received for PCT Patent Application No. PCT/US2016/031064, mailed on Dec. 14, 2017, 7 pages.

International Preliminary Report on Patentability received for PCT Patent Application No. PCT/US2020/024390, mailed on Dec. 9, 2021, 20 pages.

International Search Report and Written Opinion received for PCT Patent Application No. PCT/US2015/038161, mailed on Sep. 4, 2015, 12 pages.

International Search Report and Written Opinion received for PCT Patent Application No. PCT/US2015/054310, mailed on Jan. 20, 2016, 10 pages.

International Search Report and Written Opinion received for PCT Patent Application No. PCT/US2016/031064, mailed on Aug. 8, 2016, 8 pages.

International Search Report and written Opinion received for PCT Patent Application No. PCT/US2020/024390, mailed on Aug. 17, 2020, 22 pages.

International Search Report and Written Opinion received for PCT Patent Application No. PCT/US2020/024390, mailed on Oct. 23, 2020, 26 pages.

Invitation to Pay Additional Fees received for PCT Patent Application No. PCT/US2020/024390, mailed on Jun. 26, 2020, 15 pages.

Invitation to Pay Search Fees received for European Patent Application No. 20719301.2, mailed on Dec. 17, 2020, 5 pages.

Non-Final Office Action received for U.S. Appl. No. 14/868,757, mailed on Dec. 19, 2017, 17 pages.

Non-Final Office Action received for U.S. Appl. No. 14/752,662, mailed on Dec. 28, 2018, 16 pages.

Non-Final Office Action received for U.S. Appl. No. 14/752,662, mailed on Sep. 8, 2017, 16 pages.

Non-Final Office Action received for U.S. Appl. No. 14/841,646, mailed on Dec. 1, 2017, 23 pages.

(56) References Cited

OTHER PUBLICATIONS

Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Non-Final Office Action received for U.S. Appl. No. 16/715,928, mailed on Nov. 2, 2020, 21 pages.
Non-Final Office Action received for U.S. Appl. No. 17/728,801, mailed on Dec. 1, 2022, 10 pages.
Notice of Acceptance received for Australian Patent Application No. 2020257092, mailed on Aug. 27, 2021, 3 pages.
Notice of Acceptance received for Australian Patent Application No. 2021201403, mailed on Oct. 22, 2021, 3 pages.
Notice of Acceptance received for Australian Patent Application No. 2021261941, mailed on Mar. 15, 2023, 3 pages.
Notice of Allowance received for Chinese Patent Application No. 202011450203.2, mailed on Sep. 30, 2022, 4 pages.
Notice of Allowance received for Japanese Patent Application No. 2020-558885, mailed on Jul. 26, 2021, 4 pages.
Notice of Allowance received for Japanese Patent Application No. 2021-026630, mailed on Jan. 7, 2022, 4 pages.
Notice of Allowance received for Japanese Patent Application No. 2022-014389, mailed on Jan. 27, 2023, 4 pages.
Notice of Allowance received for Korean Patent Application No. 10-2020-7031319, mailed on Apr. 6, 2021, 5 pages.
Notice of Allowance received for Korean Patent Application No. 10-2021-7021047, mailed on Dec. 6, 2021, 3 pages.
Notice of Allowance received for Taiwanese Patent Application No. 104107330, mailed on Apr. 20, 2020, 5 pages.
Notice of Allowance received for Taiwanese Patent Application No. 104133281, mailed on Mar. 29, 2018, 4 pages.
Notice of Allowance received for U.S. Appl. No. 14/752,662, mailed on Oct. 2, 2019, 11 pages.
Notice of Allowance received for U.S. Appl. No. 14/841,646, mailed on Apr. 18, 2019, 7 pages.
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Notice of Allowance received for U.S. Appl. No. 16/715,928, mailed on Dec. 16, 2021, 13 pages.
Notice of Allowance received for U.S. Appl. No. 17/019,845, mailed on Jun. 5, 2023, 10 pages.
Notice of Allowance received for U.S. Appl. No. 17/728,801, mailed on Aug. 11, 2023, 5 pages.
Notice of Allowance received for U.S. Appl. No. 17/728,801, mailed on Feb. 28, 2023, 10 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2021201403, mailed on Mar. 16, 2021, 3 pages.
Office Action received for Australian Patent Application No. 2021261941, mailed on Nov. 3, 2022, 3 pages.
Office Action received for Chinese Patent Application No. 202011450203.2, mailed on Apr. 20, 2022, 9 pages.
Office Action received for Chinese Patent Application No. 202011450203.2, mailed on Sep. 1, 2021, 12 pages.
Office Action received for Chinese Patent Application No. 202110235995.X, mailed on Mar. 22, 2022, 17 pages.
Office Action received for Chinese Patent Application No. 202110235995.X, mailed on Sep. 30, 2022, 13 pages.
Office Action received for Danish Patent Application No. PA201570775, mailed on Aug. 23, 2016, 7 pages.
Office Action received for Danish Patent Application No. PA201570775, mailed on Mar. 21, 2016, 12 pages.
Office Action received for Danish Patent Application No. PA201570775, mailed on Mar. 28, 2017, 3 pages.
Office Action received for Danish Patent Application No. PA201570775, mailed on Oct. 25, 2017, 3 pages.
Office Action received for European Patent Application No. 20719301.2, mailed on Feb. 21, 2022, 9 pages.
Office Action received for European Patent Application No. 20719301.2, mailed on Jan. 24, 2023, 9 pages.
Office Action received for European Patent Application No. 20719301.2, mailed on Jan. 28, 2021, 15 pages.
Office Action received for European Patent Application No. 21160991.2, mailed on Mar. 24, 2022, 11 pages.
Office Action received for Japanese Patent Application No. 2021-026630, mailed on Aug. 20, 2021, 7 pages.
Office Action received for Korean Patent Application No. 10-2020-7031319, mailed on Dec. 8, 2020, 14 pages.
Office Action received for Korean Patent Application No. 10-2021-7021047, mailed on Aug. 13, 2021, 5 pages.
Office Action received for Korean Patent Application No. 10-2022-7001521, mailed on Dec. 26, 2022, 13 pages.
Office Action received for Korean Patent Application No. 10-2022-7001521, mailed on Jun. 21, 2023, 10 pages.
Office Action received for Taiwanese Patent Application No. 104107330, issued on Sep. 17, 2018, 17 pages.
Office Action received for Taiwanese Patent Application No. 104107330, mailed on Sep. 18, 2019, 8 pages.
Office Action received for Taiwanese Patent Application No. 104133281, issued on Mar. 30, 2017, 10 pages.
Phandroid, "Best Halo Themed Android Apps: Timer by Opoloo", https://www.youtube.com/watch?v=yVUJrGVDBvY/, Aug. 23, 2012, p. 1-9.
Summons to Attend Oral Proceedings received for European Patent Application No. 21160991.2, mailed on Oct. 19, 2022, 10 pages.
Supplemental Notice of Allowance received for U.S. Appl. No. 14/752,662, mailed on Dec. 27, 2019, 2 pages.
Supplemental Notice of Allowance received for U.S. Appl. No. 16/584,743, mailed on Nov. 25, 2020, 2 pages.
Time Timer, "Time Timer for iPad", Online available at: <URL:https://www.youtube.com/watch?v=IXbDCuHvdJ8/>, Dec. 10, 2012, p. 1-12.

* cited by examiner

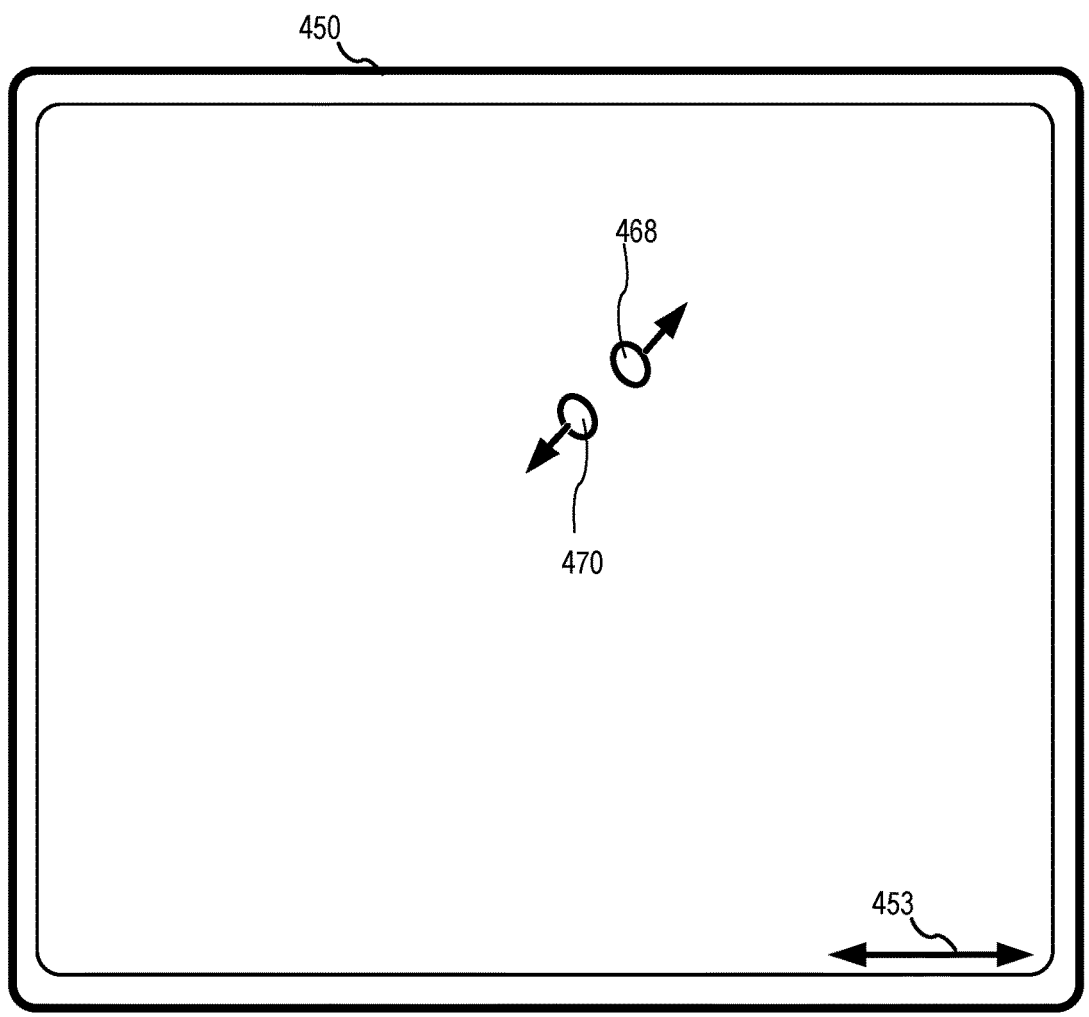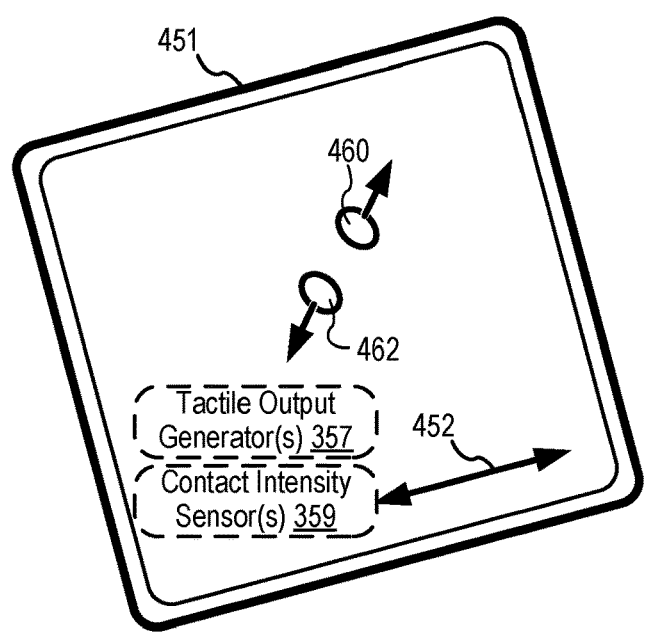
FIG. 4B

900

902

Display, at a first time, a first representation of a first lap time in a user interface

904

Move the first representation along a first axis in the user interface in accordance with a first amount of time elapsed since the first time, the first amount of time corresponding to the first lap time

906

While moving the first representation, detect a first lap input at the device at a second time

908

In response to the first lap input:

910

Cease movement of the first representation along the first axis; and display a second representation of a second lap time in the user interface ( A )

Display a first representation of a current lap time in a user interface, the first representation having a first timescale and including a first element, the first element positioned with respect to the first timescale in accordance with the current lap time on the first timescale

1004

While displaying the first representation, detect a rotational movement of a rotatable input mechanism

1006

In response to the rotational movement:

1008

Update the first representation of the current lap time to have a second timescale, different from the first timescale, in accordance with the rotational movement; and
update the position of the first element in accordance with the current lap time on the second timescale

Display a timer representation in a user interface, the timer representation including:

1104

An analog representation, the analog representation including a current duration indicator representing a current duration setting, and a digital representation representing the current duration setting

1106

While displaying the timer representation, detect a rotational movement of a rotatable input mechanism

1108

In response to the rotational movement, update the current duration indicator and the digital representation in accordance with the rotational movement

*FIG. 11*

STOPWATCH AND TIMER USER INTERFACES

CROSS-REFERENCE TO RELATED APPLICATIONS

This application is a continuation of U.S. patent application Ser. No. 17/728,801, entitled "STOPWATCH AND TIMER USER INTERFACES," filed on Apr. 25, 2022, which is a continuation of U.S. patent application Ser. No. 16/715,928, now U.S. Pat. No. 11,314,392, entitled "STOPWATCH AND TIMER USER INTERFACES," filed on Dec. 16, 2019, which is a continuation of U.S. patent application Ser. No. 14/752,662, now U.S. Pat. No. 10,552,009, entitled "STOPWATCH AND TIMER USER INTERFACES," filed on Jun. 26, 2015, which claims priority to U.S. Provisional Patent Application No. 62/044,979, entitled "STOPWATCH AND TIMER USER INTERFACES," filed Sep. 2, 2014, and U.S. Provisional Patent Application No. 62/129,825, entitled "STOPWATCH AND TIMER USER INTERFACES," filed Mar. 7, 2015, which are each hereby incorporated by reference in their entirety.

This application relates to: U.S. Provisional Patent Application entitled "Context-Specific User Interfaces," filed Sep. 2, 2014, naming Christopher Wilson as the inventor, International Patent Application Serial No. PCT/US2013/040061, entitled "Device, Method, and Graphical User Interface for Displaying User Interface Objects Corresponding to an Application," filed May 8, 2013, and International Patent Application Serial No. PCT/US2013/069483, entitled "Device, Method, and Graphical User Interface for Transitioning Between Touch Input to Display Output Relationships," filed Nov. 11, 2013. The contents of the above applications are hereby incorporated by reference in their entirety for all purposes.

BACKGROUND

1. Field

The present disclosure relates generally to computer user interfaces, and more specifically to techniques for representing lap times, adjusting timescales and setting timers in the context of a stopwatch or a timer.

2. Description of Related Art

Modern electronic devices may provide various timing functionalities. For example, electronic devices may provide stopwatch functionalities and/or timer functionalities. However, some of these functionalities may be limited in that they may display timing data in a basic manner, may not allow for user customization of timing data display parameters, and/or may not provide intuitive methods for inputting timing values by a user. There is a need for more efficient, user-friendly procedures for displaying timing data, allowing for user customization of timing data display parameters, and inputting timing values.

BRIEF SUMMARY

In some embodiments, a method of representing lap times in a user interface of an electronic device comprises: displaying, at a first time, a first representation of a first lap time in a user interface; moving the first representation along a first axis in the user interface in accordance with a first amount of time elapsed since the first time, the first amount of time corresponding to the first lap time; while moving the first representation, detecting a first lap input at the device at a second time; in response to the first lap input: ceasing movement of the first representation along the first axis; and displaying a second representation of a second lap time in the user interface; and moving the second representation along the first axis in the user interface in accordance with a second amount of time elapsed since the second time, the second amount of time corresponding to the second lap time, wherein a relative positioning of the first representation and the second representation along the first axis corresponds to a difference between the first lap time and the second lap time.

In some embodiments, a method of updating the timescale of a lap time representation in a user interface of an electronic device comprises: displaying a first representation of a current lap time, the first representation having a first timescale and including a first element, the first element positioned with respect to the first timescale in accordance with the current lap time on the first timescale; while displaying the first representation, detecting a rotational movement of a rotatable input mechanism; and in response to the rotational movement: updating the first representation of the current lap time to have a second timescale, different from the first timescale, in accordance with the rotational movement; and updating the position of the first element in accordance with the current lap time on the second timescale.

In some embodiments, a method of updating a current duration setting of a timer in a user interface of an electronic device comprises: displaying a timer representation in a user interface, the timer representation including: an analog representation, the analog representation including a current duration indicator representing a current duration setting, and a digital representation representing the current duration setting; while displaying the timer representation, detecting a rotational movement of the rotatable input mechanism; and in response to the rotational movement, updating the current duration indicator and the digital representation in accordance with the rotational movement.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 9A-9B are a flow diagram illustrating a process for representing lap times in a user interface of an electronic device.

FIG. 10 is a flow diagram illustrating a process for updating the timescale of a lap time representation in a user interface of an electronic device.

FIG. 11 is a flow diagram illustrating a process for updating a current duration setting of a timer in a user interface of an electronic device.

DESCRIPTION OF EMBODIMENTS

Figure 1A:
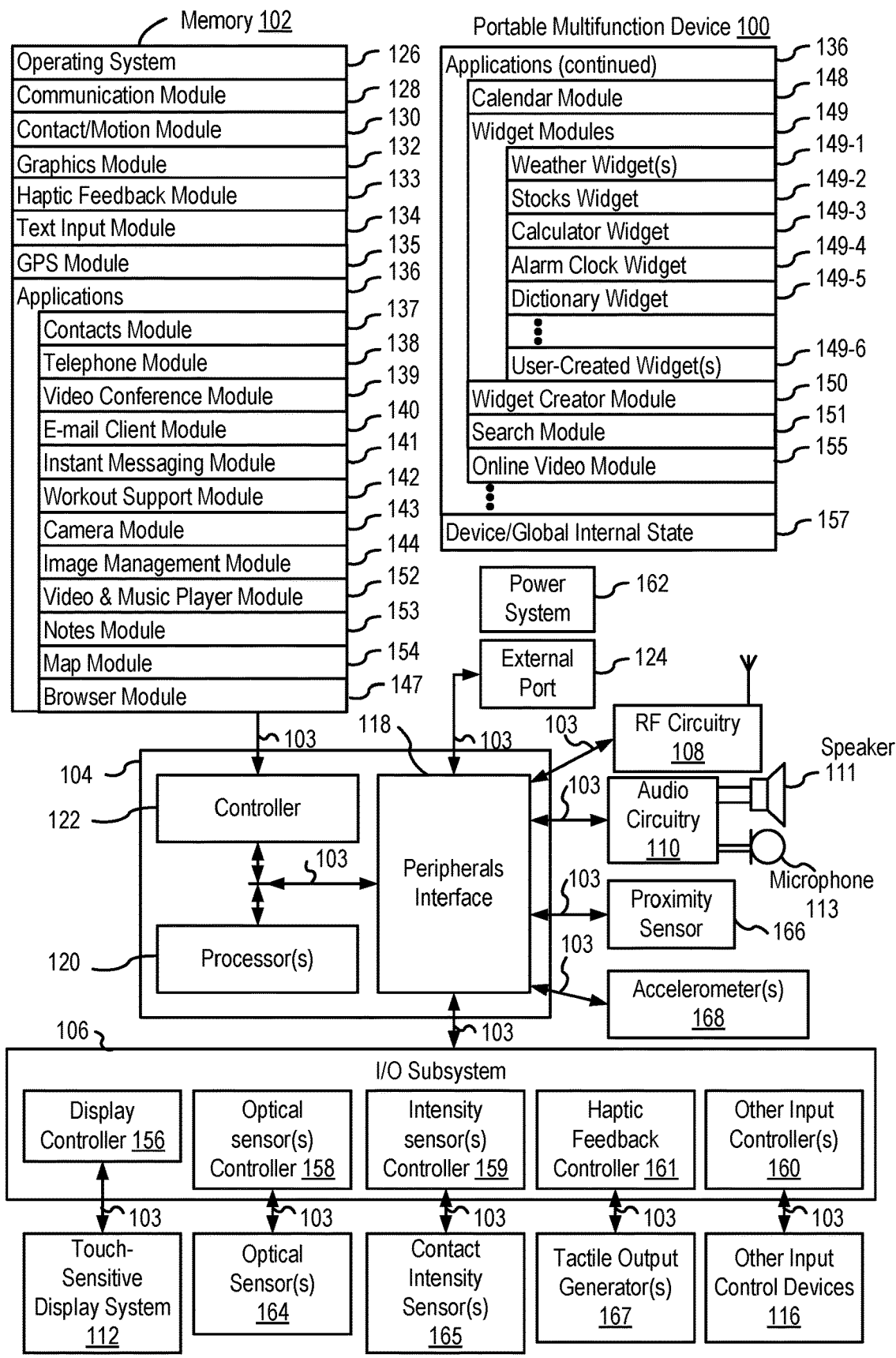
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

It is desirable for a device to provide efficient, user-friendly procedures for displaying timing data (e.g., displaying lap times and their representations), allowing for user customization of timing data display parameters (e.g., allowing for user modification of timescales of timing elements), and inputting timing values (e.g., allowing for robust entry of timer settings). Below, FIGS. 1A-1B, 2, 3, 4A-4B, and 5A-5B provide a description of exemplary devices that optionally perform lap time representing, timescale adjusting and timer setting techniques. FIGS. 6-8 illustrate exemplary user interfaces involved in the above techniques. The user interfaces in the figures are also used to illustrate the lap time representing, timescale adjusting and timer setting processes described below, including the processes in FIGS. 9-11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 801.11n and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
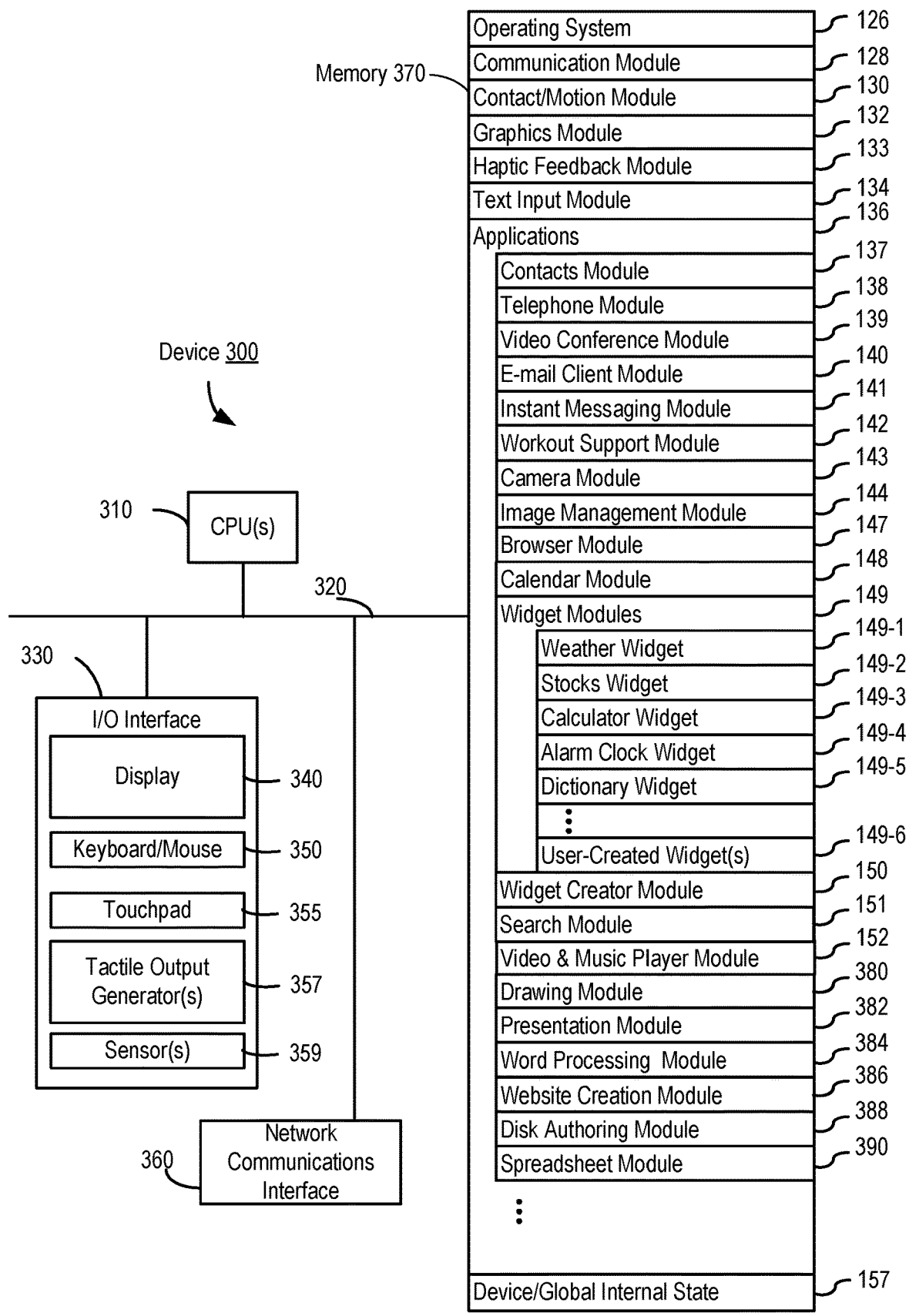
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video Conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web-page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
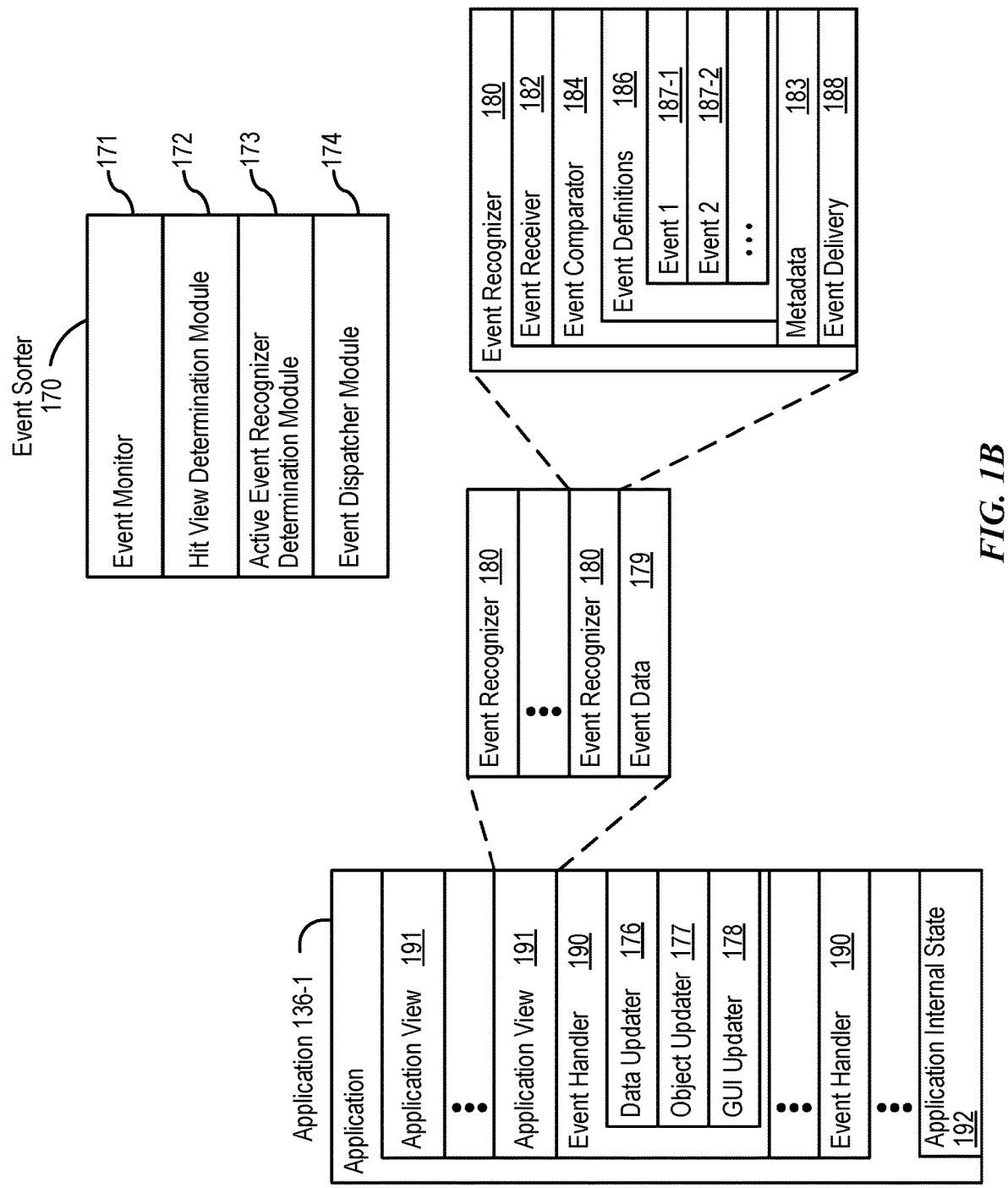
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
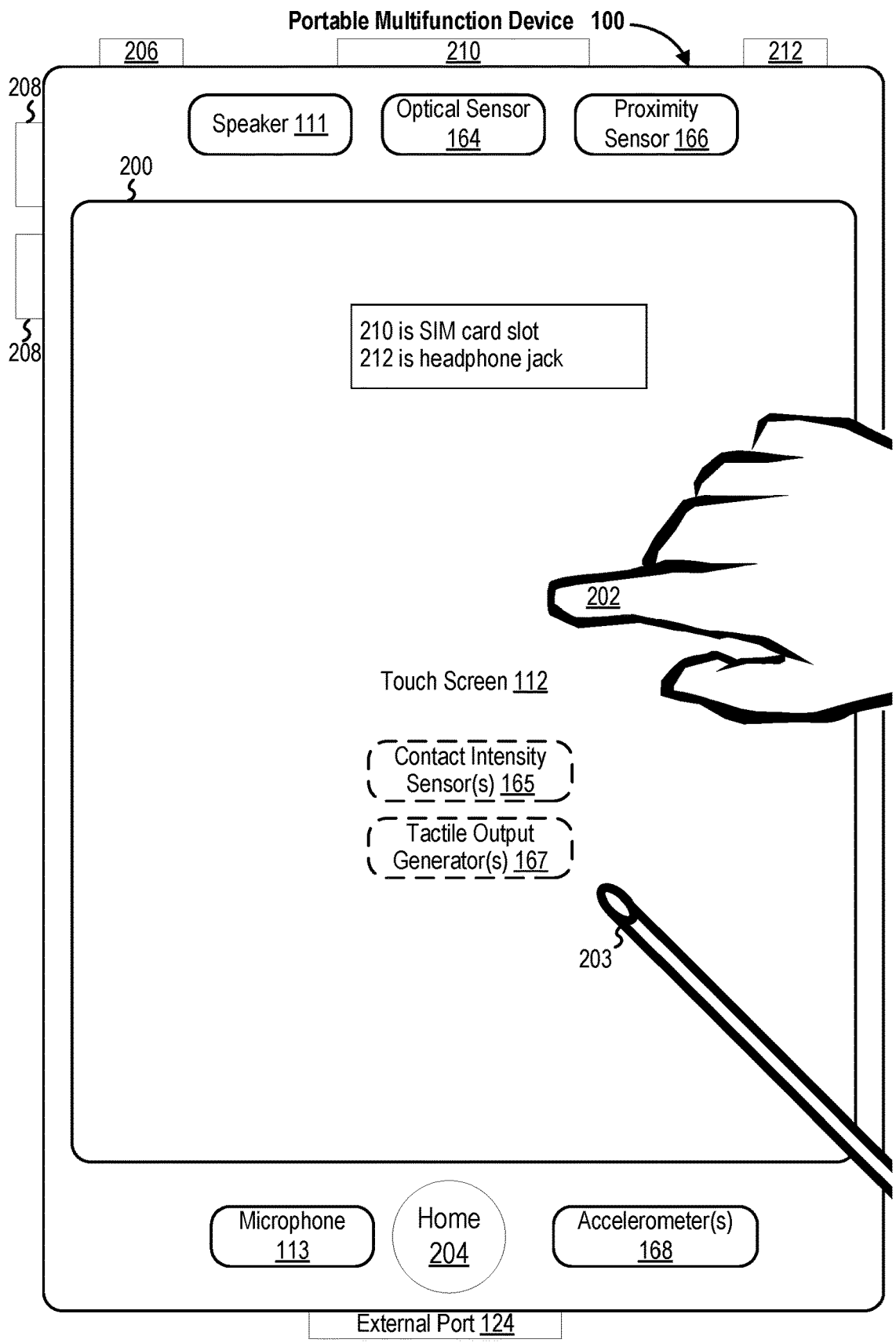
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
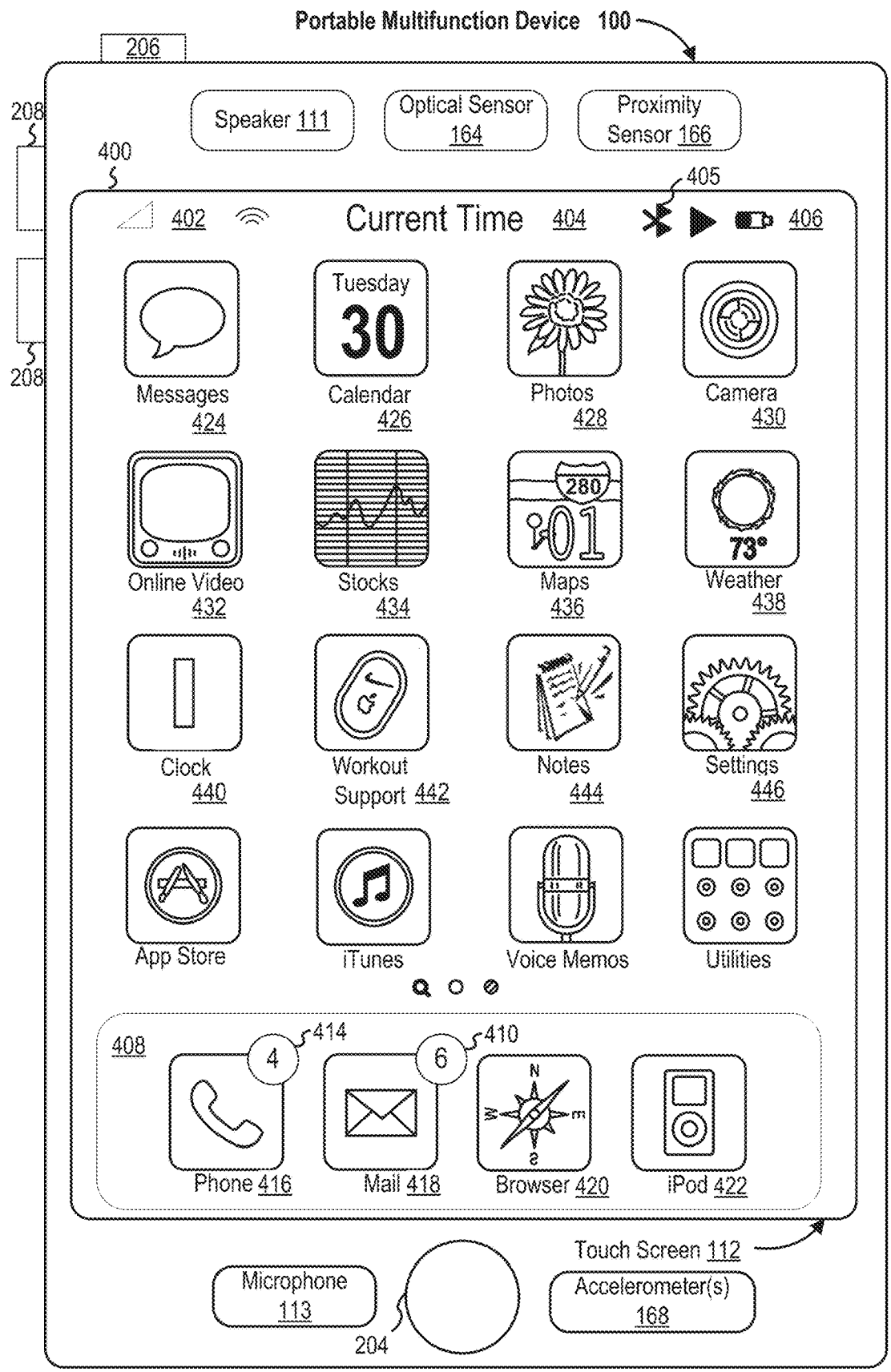
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
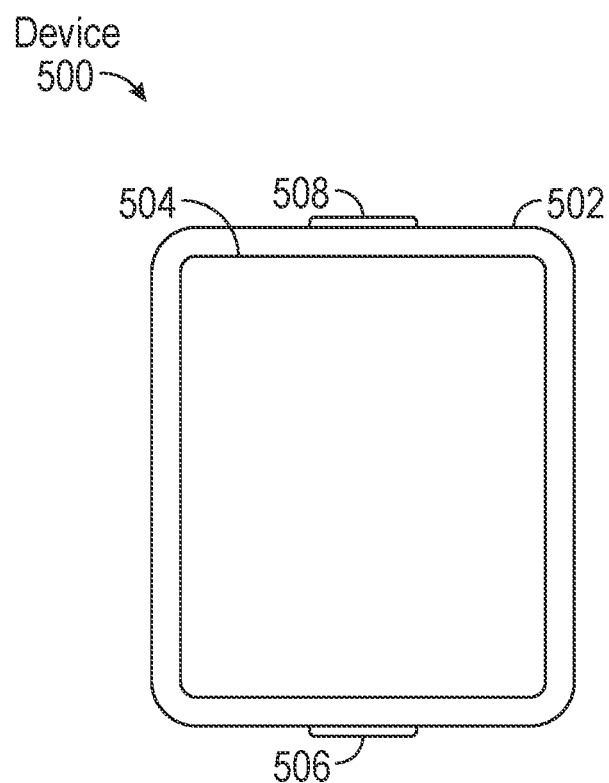
FIG. 5A is a block diagram illustrating a portable multifunction device with a touch-sensitive display and a rotatable input mechanism in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013 and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
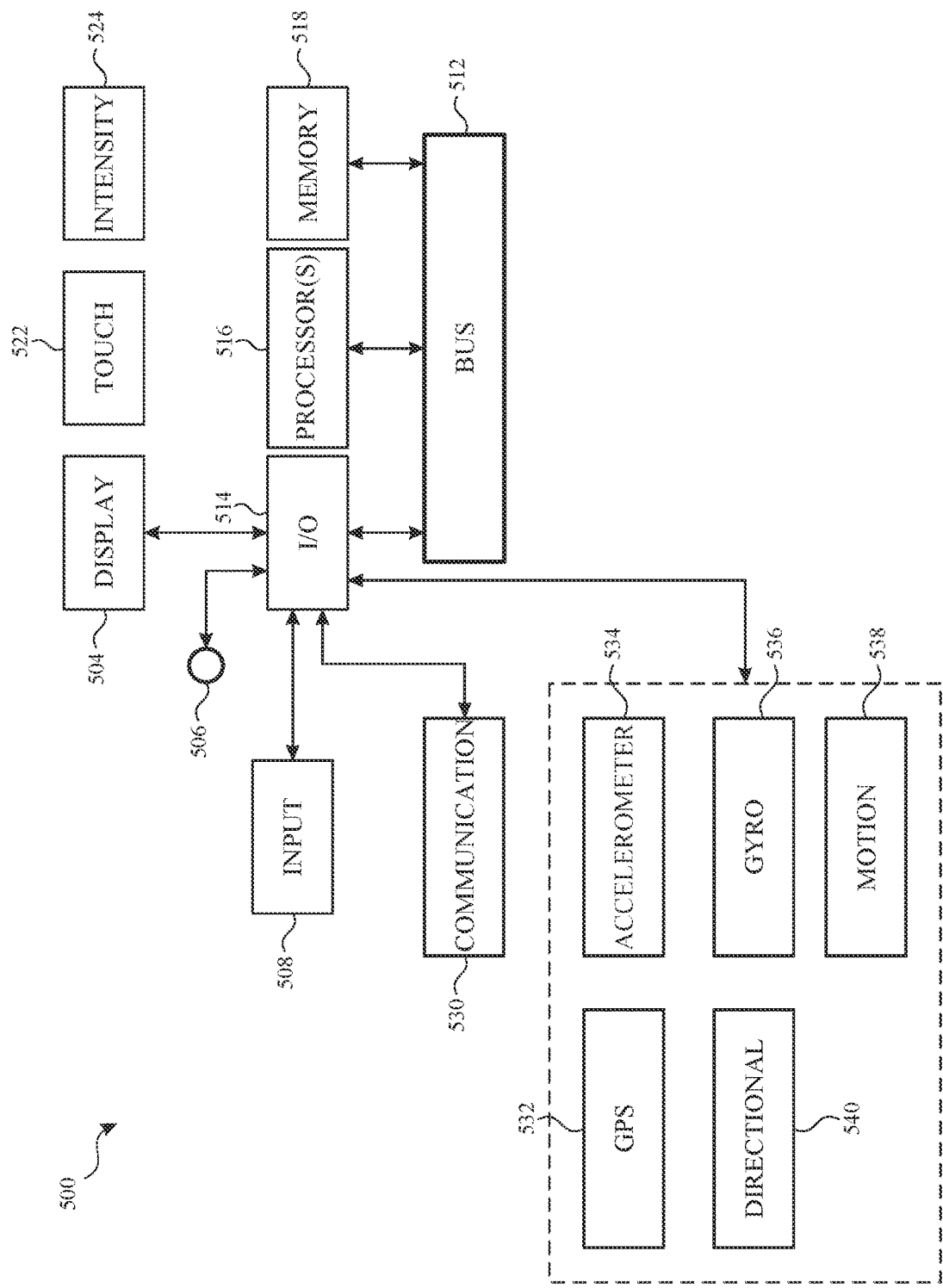
FIG. 5B illustrates a portable multifunction device having a touch-sensitive display and a rotatable input mechanism in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer readable storage medium, for storing computer-executable instructions, which, when executed by one or more computer processors 516, for example, can cause the computer processors to perform the techniques described above, including processes 900-1100 (FIGS. 9A, 9B, 10, and 11). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch-screen display, a detected contact on the touch-screen acts as a "focus selector" so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In, some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes) which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed to towards user interfaces ("UI") and associated processes that may be implemented on a multifunction device with a display and a touch-sensitive surface, such as devices 100, 300, and/or 500 (FIGS. 1A, 3A, and/or 5A), to provide lap time representing, timescale adjusting and timer setting functionalities.

1. Representing Lap Times

Multifunction devices, such as devices 100, 300, and/or 500 (FIGS. 1A, 3A, and/or may provide various stopwatch functionalities. Some such functionalities optionally include tracking the amount of time elapsed since a specified moment in time (e.g., since selection of a "start" button), tracking one or more lap times, and any other functionality that may be associated with a stopwatch. The embodiments described below are directed to multifunction device(s) that provide such stopwatch functionalities.

Figure 6A:
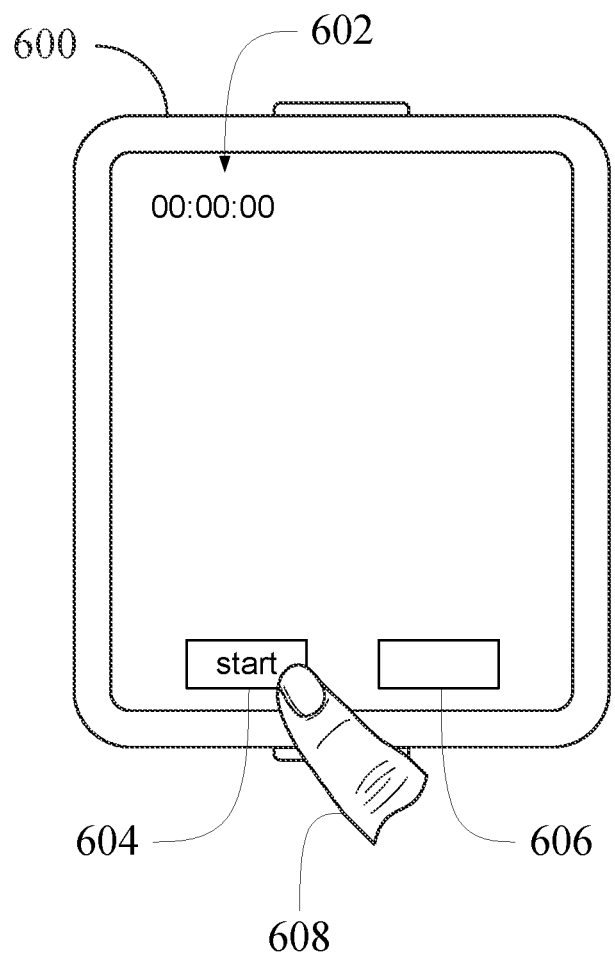
FIGS. 6A-6Q illustrate exemplary user interface(s) for representing lap time(s) in the user interface(s) of electronic device(s).

FIG. 6A illustrates exemplary electronic device 600 and exemplary associated user interface. Electronic device 600 may be any one of devices 100, 300, and/or 500 (FIGS. 1A, 3A, and/or 5A). In the illustrated embodiment, device 600 is a wearable device. In some embodiments, device 600 provides one or more stopwatch functionalities, one of which may be representing lap times. Device 600 optionally displays one or more user interfaces for representing the lap times.

The user interface displayed by device 600 in FIG. 6A optionally includes a digital stopwatch representation 602. Digital stopwatch representation 602 optionally includes a minutes portion (far-left portion), a seconds portion (middle portion), and a $\frac{1}{10}^{th}$ second portion (far-right portion), though it is understood that digital stopwatch representation 602 may have any appropriate structure. Digital stopwatch representation 602 optionally displays the total time elapsed after "start" button 604 is selected. In some embodiments, the user interface includes button 606, which can be inactive until button 604 has been selected, as will be described in more detail below.

In the illustrated embodiment, button 604 has been selected by finger 608. It is understood that while the embodiments in this disclosure may be described as involving finger interaction (e.g., selection of a user interface button with a finger), the scope of the disclosure is not so limited. Any appropriate interaction with the user interfaces of the disclosure is within the scope of the disclosure, including interaction with objects such as a stylus. Further, it is understood that user interface input elements (e.g., buttons) may be replaced by physical input elements while remaining within the scope of the disclosure.

Figure 6B:
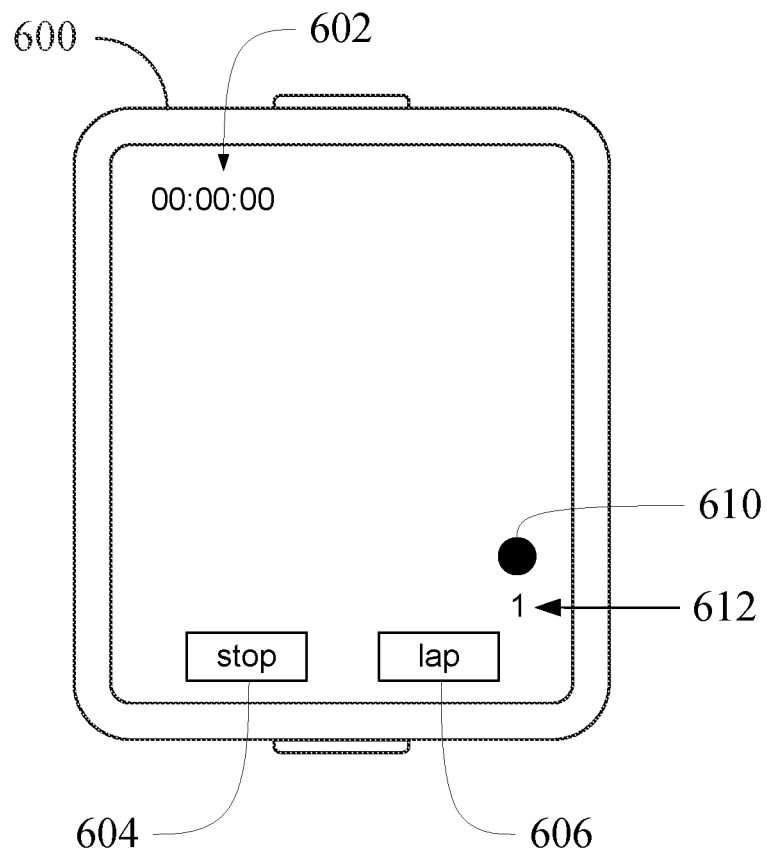

FIG. 6B illustrates an exemplary user interface presented by device 600 in response to detecting selection of button 604 to start timing with digital stopwatch representation 602. Button 604 optionally changes from a "start" button to a "stop" button, selection of which optionally stops timing with digital stopwatch representation 602. Additionally, button 606 optionally becomes active as a "lap" button, selection of which optionally delineates and defines one lap time from another lap time, the details of which will be further described below.

Lap time representation 610 is optionally displayed in the user interface in response to selection of button 604 in FIG. 6A. Lap time representation 610 optionally represents a lap (in this case, the first lap after selection of button 604 in FIG. 6A, as indicated by lap number representation 612). Though lap time representation 610 is illustrated as a dot, it is understood that any suitable user interface element may be used to represent laps in accordance with the embodiments of the disclosure (e.g., squares, triangles, etc.). As time elapses, lap time representation 610 optionally moves along a specified axis in the user interface. For example, lap time representation 610 optionally moves vertically in the user interface as time elapses; it is understood, however, that lap time representation 610 may move in any other direction along any other axis in the user interface within the scope of the disclosure.

Figure 6C:
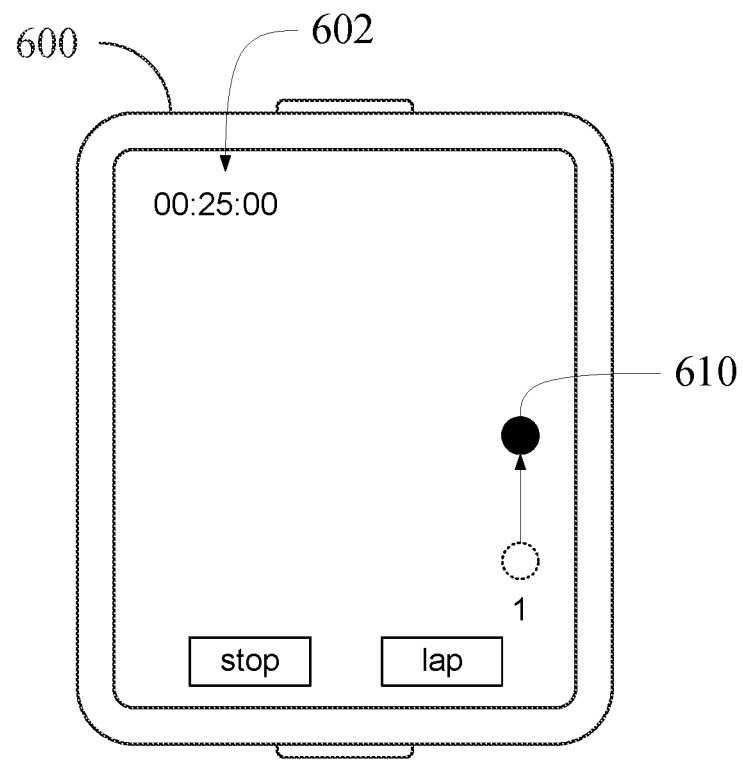

FIG. 6C illustrates an exemplary user interface presented by device 600 after 25 seconds have elapsed since selection of button 604 in FIG. 6A. Digital stopwatch representation 602 reflects the total elapsed time of 25 seconds.

Lap time representation 610 optionally moves vertically in the user interface in accordance with the amount of time that has elapsed since selection of button 604 in FIG. 6A (i.e., in accordance with 25 seconds). Although lap time representation 610 is illustrated as having moved directly from its initial location to its current location, it is understood that lap time representation 610 optionally moves in a continuous manner in the user interface in accordance with the passage of time. For example, at a point in time when 12.5 seconds had elapsed since selection of button 604 in FIG. 6A, lap time representation 610 was optionally located at a point in the middle of its initial location (in FIG. 6B) and its current location (in FIG. 6C).

Figure 6D:
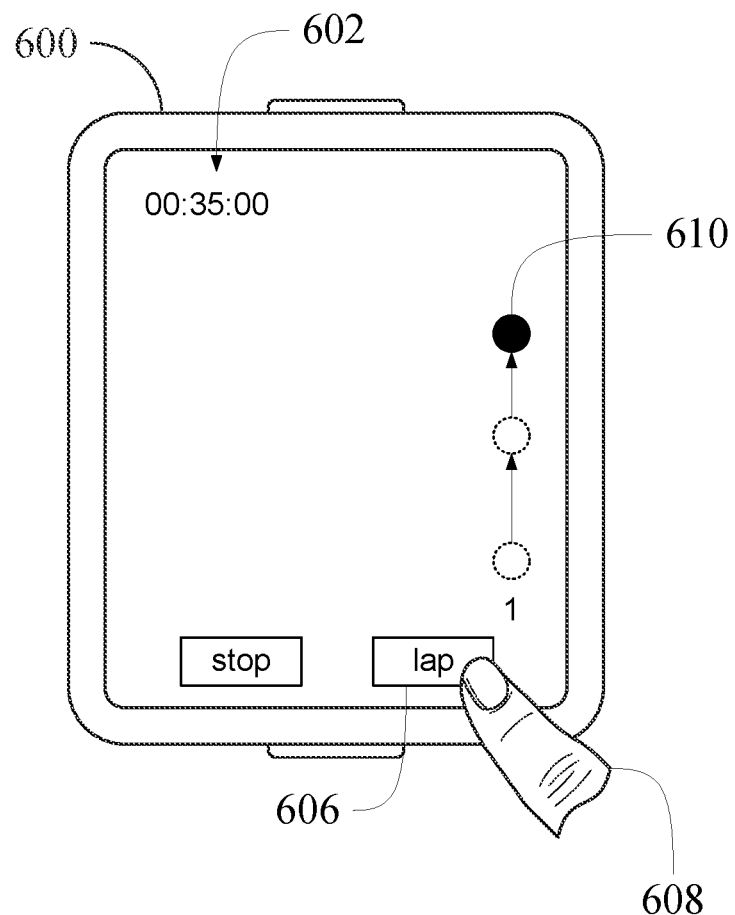

FIG. 6D illustrates an exemplary user interface presented by device 600 after 35 seconds have elapsed since selection of button 604 in FIG. 6A. Digital stopwatch representation 602 reflects the total elapsed time of 35 seconds. Lap time representation 610 has optionally further moved vertically in the user interface in accordance with the additional 10 seconds that have elapsed since FIG. 6C. Additionally, "lap" button 606 has been selected to define the end of the first lap.

Figure 6E:
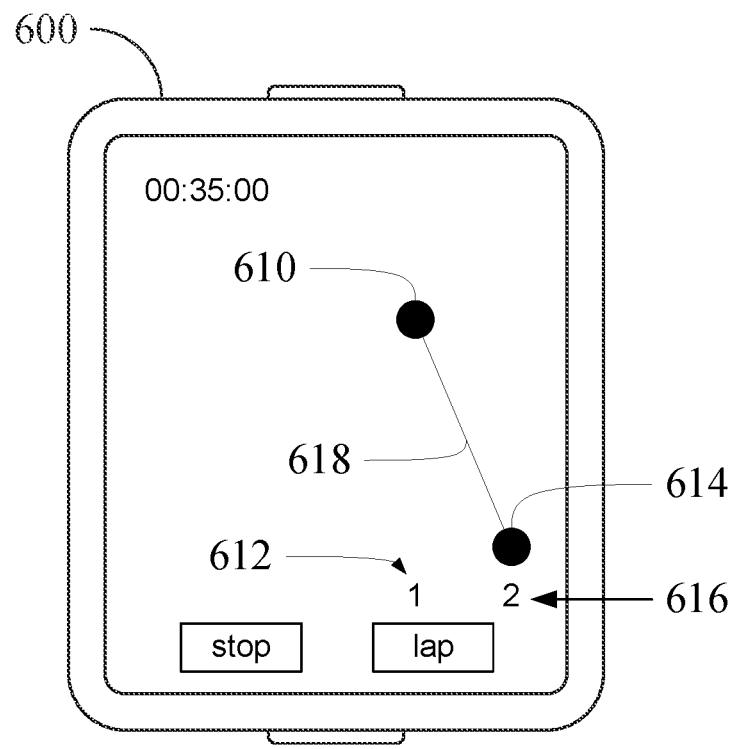

FIG. 6E illustrates an exemplary user interface presented by device 600 after selection of button 606 in FIG. 6D. In response to the selection of button 606 in FIG. 6D, lap time representation 610 optionally stops moving vertically in the user interface, because the end of the lap associated with lap time representation 610 (i.e., the first lap) has optionally been defined by the selection of button 606 in FIG. 6D. Additionally, lap time representation 614, which optionally corresponds to the second lap as indicated by lap number representation 616, is optionally displayed in the user interface. Lap time representation 614 is optionally displayed at the same initial vertical position in the user interface as the initial vertical position of lap time representation 610 in FIG. 6B.

To allow for the display of lap time representation 614 and lap number representation 616 in the user interface, lap time representation 610 and lap number representation 612 are optionally moved horizontally to the left (i.e., in a direction orthogonal to the vertical axis) in the user interface in response to the selection of button 606 in FIG. 6D. In some embodiments, the horizontal movement of lap time representation 610 and lap number representation 612 is optionally animated. Additionally, lap time representation 610 and lap time representation 614 are optionally connected by line 618. It is understood that in some embodiments, lap time representations (e.g., lap time representation 610) are initially displayed on the left side of the user interface, and additional lap time representations are added to the right of them—in such embodiments, existing lap time representations optionally do not need to be moved horizontally when a new lap time representation is added to the user interface (except when the horizontal space in the user interface becomes completely filled with lap time representations, in which case older lap time representations are optionally shifted off the user interface, but can be scrolled back into view in response to any appropriate input for doing so).

Figure 6F:
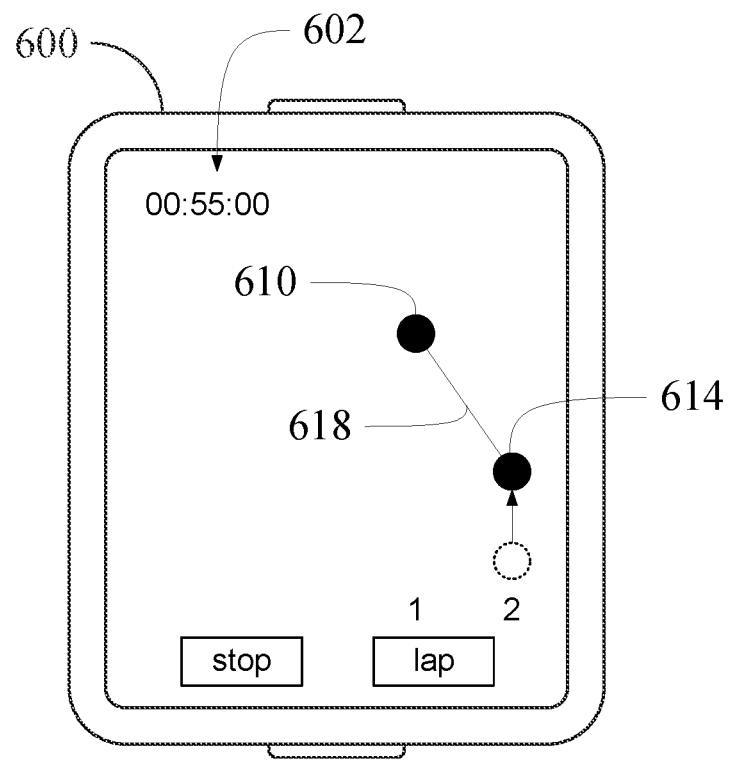

FIG. 6F illustrates an exemplary user interface presented by device 600 after 20 seconds have elapsed since selection of button 606 in FIG. 6E (and after 55 seconds have elapsed since selection of button 604 in FIG. 6A). Digital stopwatch representation 602 reflects the total elapsed time of 55 seconds since selection of button 604 in FIG. 6A. As discussed before, lap time representation 610 is optionally located at the same vertical position as in FIG. 6E, because the lap time for the lap associated with lap time representation 610 (i.e., the first lap) has optionally already been defined and set.

Lap time representation 614 optionally moves vertically in the user interface in accordance with the passage of 20 seconds since selection of button 606 in FIG. 6E. Lap time representation 614 optionally moves in a manner similar to as described previously with respect to lap time representation 610. Line 618 optionally continues to connect lap time representation 610 and lap time representation 614.

Figure 6G:
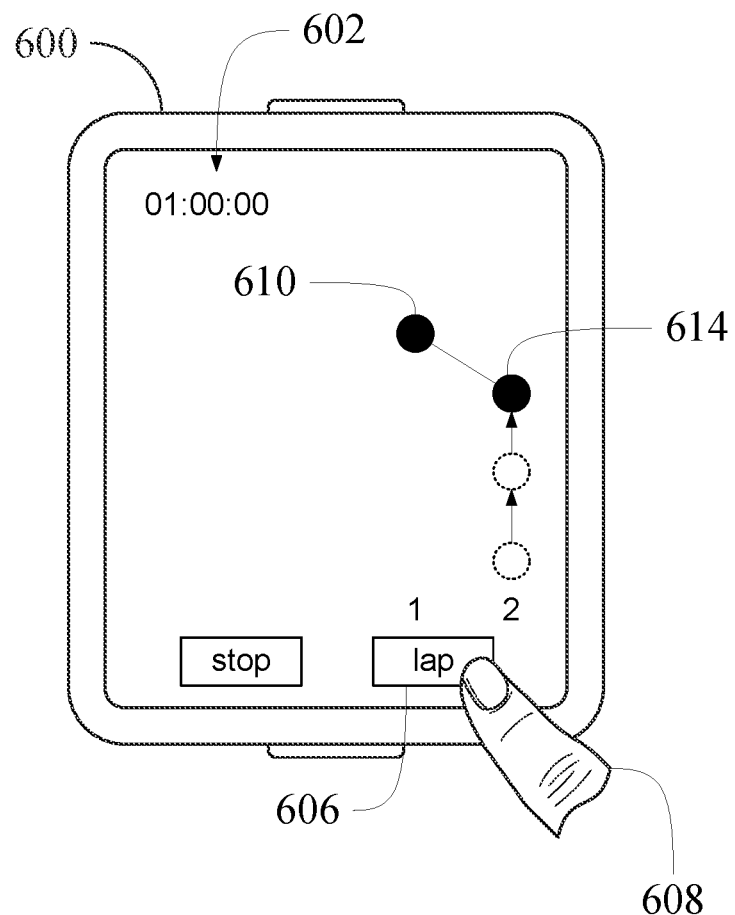

FIG. 6G illustrates an exemplary user interface presented by device 600 after 25 seconds have elapsed since selection of button 606 in FIG. 6E (and after 60 seconds have elapsed since selection of button 604 in FIG. 6A). Digital stopwatch representation 602 reflects the total elapsed time of 60 seconds (i.e., one minute) since selection of button 604 in FIG. 6A. Lap time representation 614 has optionally moved further vertically in the user interface in accordance with the additional five seconds that have elapsed since FIG. 6F. Additionally, "lap" button 606 has been selected by finger 608.

Figure 6H:
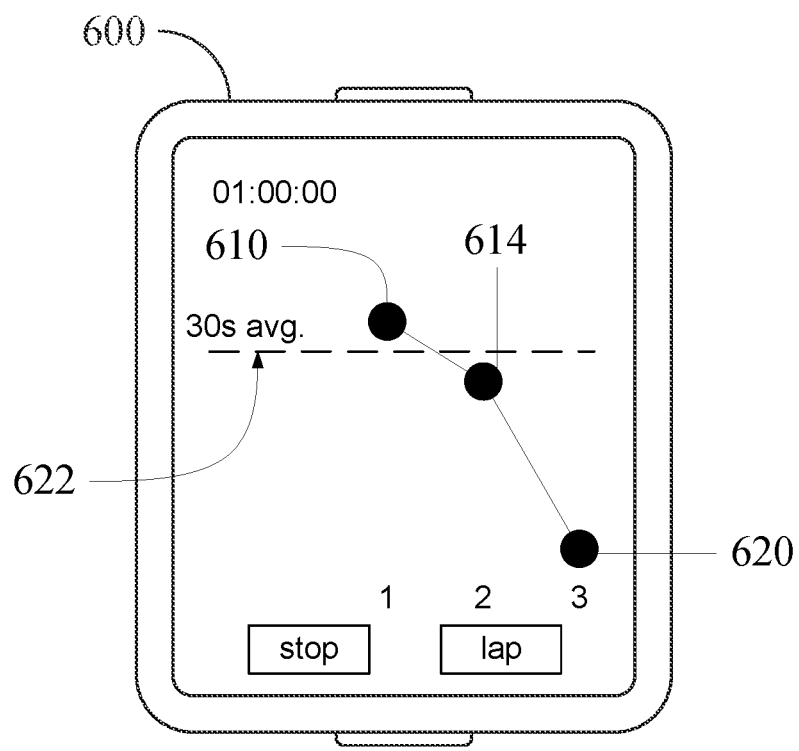

FIG. 6H illustrates an exemplary user interface presented by device 600 after selection of button 606 in FIG. 6G. Similar to as described before with respect to FIG. 6E, in response to selection of button 606 in FIG. 6G, lap time representation 614 optionally stops moving vertically in the user interface, because the end of the lap associated with lap time representation 614 (i.e., the second lap) has optionally been defined by selection of button 606 in FIG. 6G. Additionally, lap time representation 620, which optionally corresponds to the third lap as indicated by its corresponding lap number representation, is optionally displayed in the user interface. Lap time representation 620 is optionally displayed at the same initial vertical position in the user interface as the initial vertical position of lap time representation 610 in FIG. 6B and lap time representation 614 in FIG. 6E. Additionally, lap time representation 614 and lap time representation 620 are optionally connected by a line.

As before, in order to allow for the display of lap time representation 620 and its corresponding lap number representation in the user interface, lap time representation 610 and its corresponding lap number representation, and lap time representation 614 and its corresponding lap number representation, are optionally moved horizontally to the left in the user interface in response to the selection of button 606 in FIG. 6G.

Because full lap times have been defined for the first lap and the second lap, an average lap time is optionally determined and displayed in the user interface. The average lap time is optionally the average lap time of all fully-defined laps since selection of "start" button 604 in FIG. 6A. The average lap time is optionally indicated by average lap time indicator 622 in the user interface, which is optionally a horizontal line at a vertical position corresponding to the time value of the average lap time (in this case, 30 seconds). Average lap time indicator 622 is optionally a dashed line, as illustrated. In the illustrated embodiment, average lap time indicator 622 is positioned between lap time representation 610 and lap time representation 614, because the average lap time of 30 seconds is optionally between 35 seconds (the lap time associated with lap time representation 610) and 25 seconds (the lap time associated with lap time representation 614).

Figure 6I:
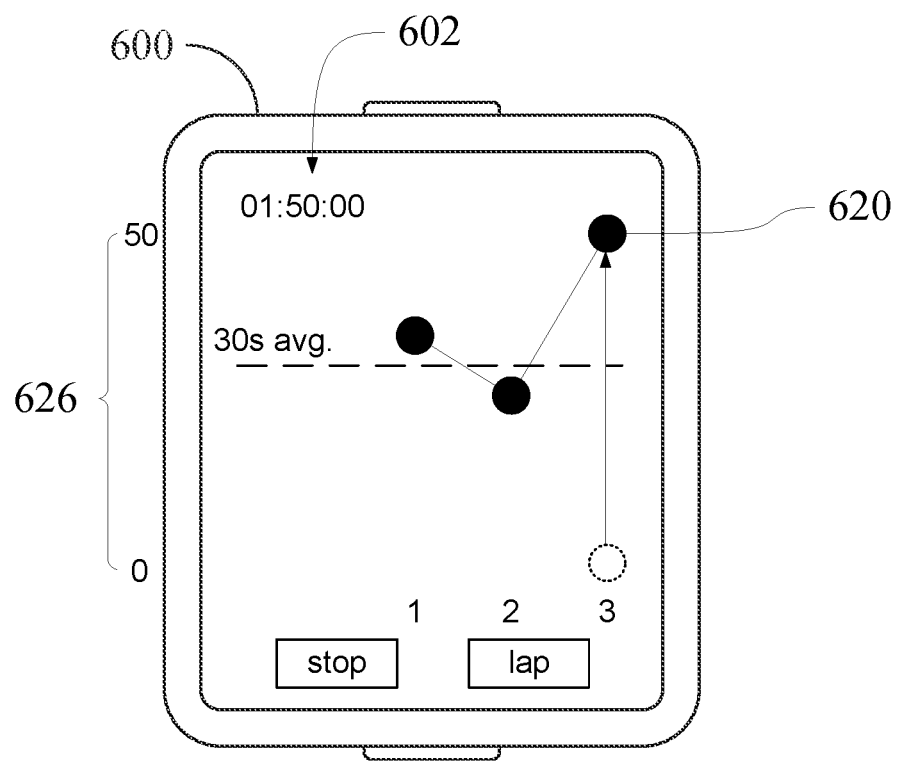

FIG. 6I illustrates an exemplary user interface presented by device 600 when lap time representation 620 has reached a maximum time on timescale 626 in the user interface. Digital stopwatch representation 602 reflects the total elapsed time of 110 seconds (i.e., one minute and fifty seconds) since selection of button 604 in FIG. 6A. The user interface optionally has timescale 626 that can display a minimum and a maximum lap time. For example, timescale 626 can optionally display a minimum lap time of 0 seconds and a maximum lap time of 50 seconds. Timescale 626 is optionally the same timescale that was in FIGS. 6A-6H, though it was not illustrated for ease of description. In the embodiment of FIG. 6I, lap time representation 620 has moved (e.g., continuously moved) from its initial position to a position corresponding to 50 seconds—the maximum lap time that can be displayed by timescale 626.

In some embodiments, timescale 626 optionally continuously changes as time continues to elapse, and as lap time representation 620 continues to correspond to a lap time that is longer than 50 seconds. In some embodiments, timescale 626 optionally does not change until the lap associated with lap time representation 620 has been fully-defined (e.g., by selection of the "lap" button), as will be described below.

Figure 6J:
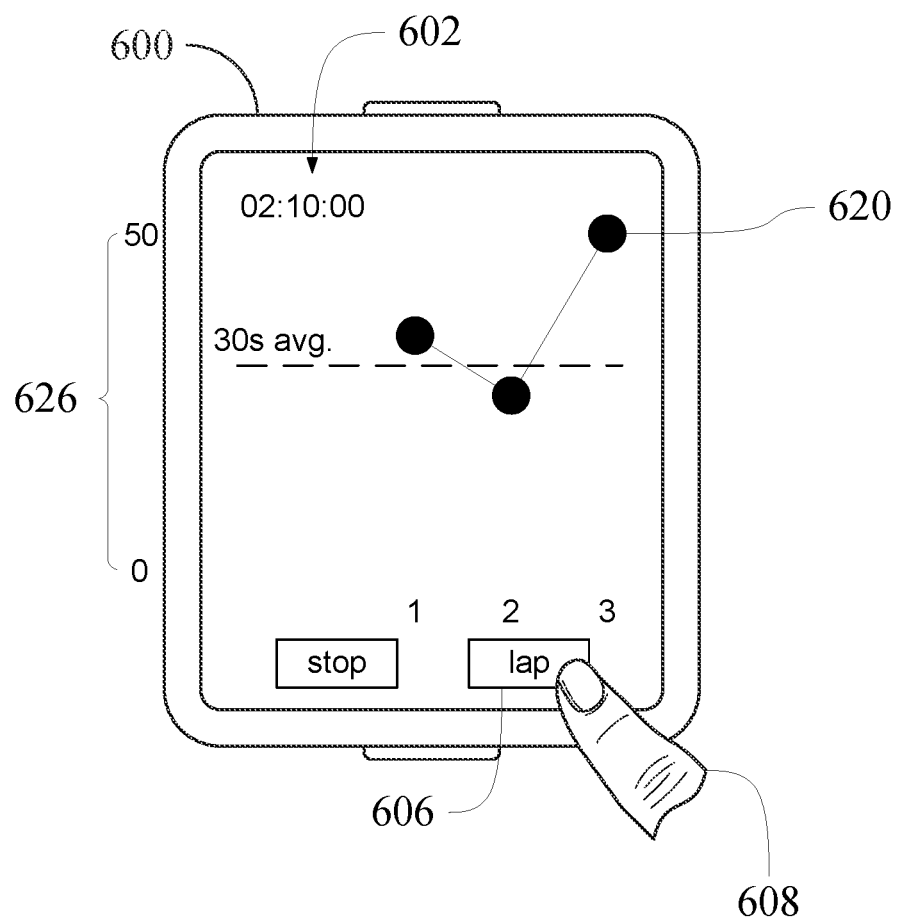

FIG. 6J illustrates an exemplary user interface presented by device 600 when lap time representation 620 has exceeded a maximum lap time on timescale 626 in the user interface. In the embodiment illustrated in FIG. 6J, timescale 626 optionally does not change until the lap associated with lap time representation 620 has been fully-defined (e.g., by selection of the "lap" button), as mentioned above. Thus, despite 20 seconds having elapsed since the time illustrated in FIG. 6I (as indicated by the total elapsed time of 130 seconds (i.e., two minutes and ten seconds) in digital stopwatch representation 602), lap time representation 620 has exhibited no further vertical movement in the user interface, because lap time representation 620 has optionally already exceeded the maximum lap time that can be displayed on timescale 626. As illustrated, "lap" button 606 has been selected by finger 608.

Figure 6K:
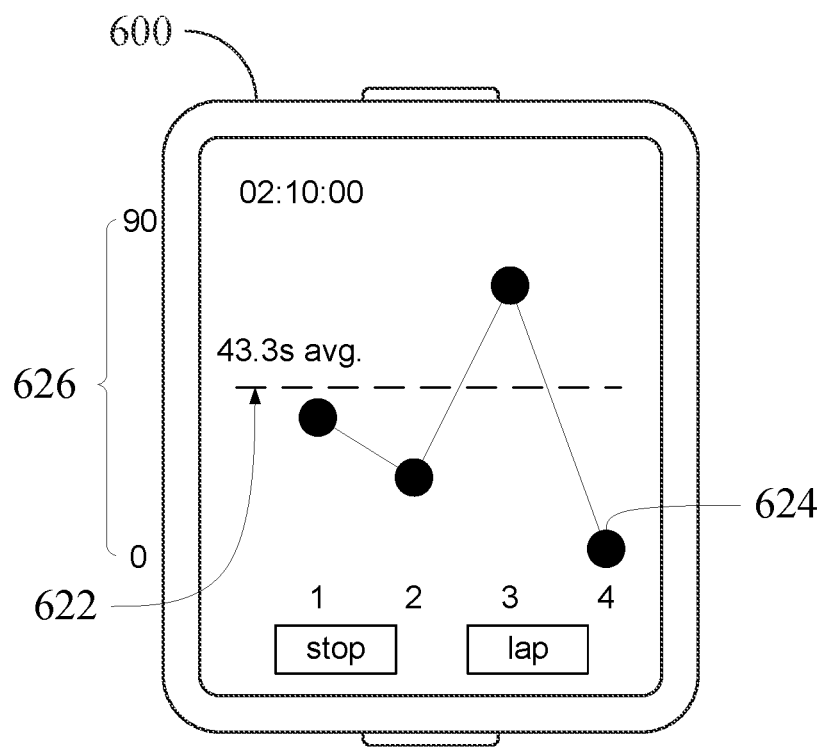

FIG. 6K illustrates an exemplary user interface presented by device 600 after selection of button 606 in FIG. 6J. Similar to as described before, the lap time representations and their corresponding lap number representations have moved horizontally to the left in the user interface to allow for display of lap time representation 624 and it corresponding lap number representation. Additionally, the average lap time has been re-determined to be 43.3 seconds based on fully-defined lap times of 35 seconds (for the first lap), 25 seconds (for the second lap), and 70 seconds (for the third lap). The average lap time of 43.3 seconds is reflected by average lap time indicator 622.

Additionally, timescale 626 has been adjusted to allow for display of all of the fully-defined lap times. For example, timescale 626 is optionally adjusted to have a maximum lap time that is greater than any of the fully-defined lap times. In the illustrated embodiment, timescale 626 has been adjusted to display a minimum lap time of 0 seconds and a maximum lap time of 90 seconds. The vertical positions of the lap time representations and average lap time indicator 622 are optionally also adjusted in accordance with the adjusted timescale 626 so as to be appropriately positioned in the user interface with respect to the adjusted timescale 626.

Figure 6L:
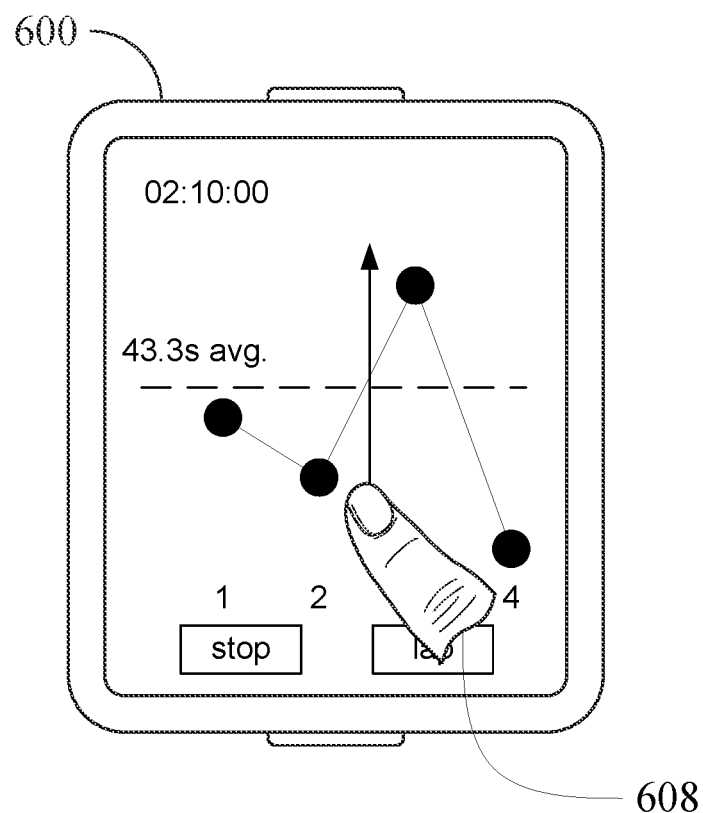

At any point in FIGS. 6B-6K, a user may wish to view a list of lap times in addition to the lap time representations discussed above. In some embodiments, a list of lap times is optionally displayed in response to detection of a specified input at device 600 (e.g., a specified input on the touch-sensitive surface of device 600). FIG. 6L illustrates an exemplary input detected at device 600 for displaying a list of lap times associated with the lap time representations displayed in the user interface. In the embodiment illustrated, a vertical swipe by finger 608 has been detected on the touch-sensitive surface of device 600. The vertical swipe may be detected at any location on the touch-sensitive surface of device 600.

Figure 6M:
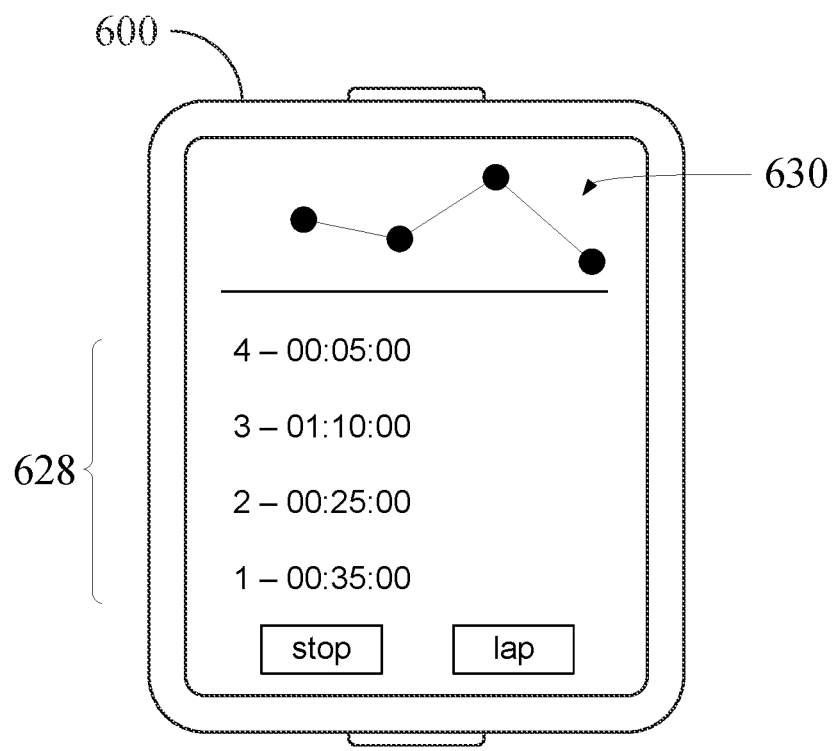

FIG. 6M illustrates an exemplary user interface presented by device 600 after detection of the vertical swipe in FIG. 6L. In response to the vertical swipe detected by device 600 in FIG. 6L, a display area of the lap time representations is optionally reduced so as to allow display of lap time list 628 in the user interface. These smaller lap time representations are illustrated as reduced-size lap time representations 630. In some embodiments, the reduction in the display area of the lap time representations is performed as vertical swipe is being detected on the touch-sensitive surface of device 600. As stated above, the user interface also includes lap time list 628. The lap times in lap time list 628 optionally correspond to the lap times represented by the lap time representations discussed previously, as well as reduced-size lap time representations 630. Lap time list 628 optionally includes the lap number for each lap, and the lap time for each lap. Lap time list 628 may be scrolled vertically up and down in response to vertical swipe gestures detected on the touch-sensitive surface of device 600. The user interface illustrated in FIG. 6M thus allows a user to view lap times as lap time representations (reduced-size lap time representations 630) and as a list (lap time list 628).

Device 600 is optionally able to display various stopwatch views. Further, a user is optionally able to switch between the various stopwatch views in response to specified inputs at device 600 for doing so (e.g., from a menu bar including a list of stopwatch views from which to choose, in response to a specified gesture detected at device 600, in response to detection of a specified mechanical input at device, etc.). In some examples, a menu or selection of stopwatch views are optionally displayed in response to an input including a contact detected on a touch-sensitive surface of device 600 (sometimes, anywhere on the touch-sensitive surface of the device), the contact having a characteristic intensity greater than an intensity threshold. When switching between the various stopwatch views, stopwatch data is optionally preserved. That is to say that data relating to the number of laps recorded so far, the lap times associated with each, the average lap time, the length of the current lap, the total elapsed time of all laps, and any other data relating to the laps discussed above is optionally preserved on device 600 when switching between the stopwatch views. As a result, the different stopwatch views are able to access and/or present that preserved data in, perhaps, a different manner.

Figure 6N:
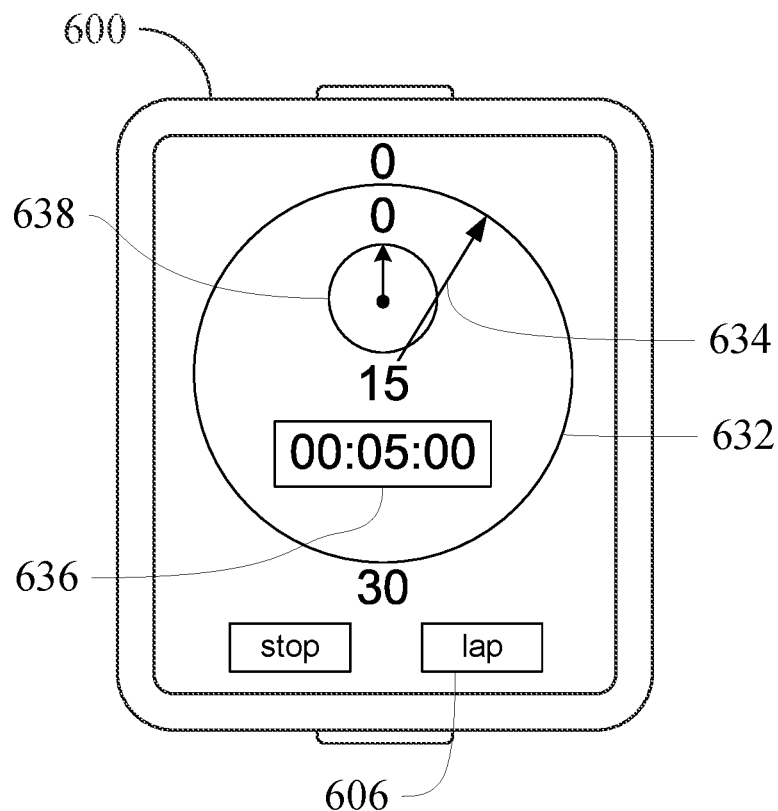

The embodiments described with reference to FIGS. 6A-6M are optionally associated with a first stopwatch view (e.g., a graph stopwatch view). FIG. 6N illustrates an exemplary user interface presented by device 600 for displaying lap times in a second stopwatch view (e.g., an analog stopwatch view). A user may have switched to the analog stopwatch view from the graph stopwatch view, but this need not be the case (e.g., the user may have started timing in the analog stopwatch view). The user interface in the analog stopwatch view of FIG. 6N optionally includes analog dial 632, which has a timescale of 0-60 seconds and has hand 634 to indicate a current lap time on the timescale of 0-60 seconds. Analog dial 632 is optionally used to track seconds that have elapsed in a current lap. Analog dial 638 optionally has a timescale of 0-30 minutes, and is optionally used to track minutes that have elapsed in a current lap. Lap times over 60 seconds in length are optionally tracked using a combination of analog dial 638 and analog dial 632. For example, to display a lap time of one minute thirty seconds, analog dial 638 optionally displays one minute of time, and analog dial 632 optionally displays 30 seconds of time. It is understood that the timescales of 0-60 seconds for analog dial 632 and 0-30 minutes for analog dial 638 are exemplary only, and do not limit the scope of the disclosure.

The user interface in FIG. 6N also optionally includes digital stopwatch representation 636 for displaying the current lap time in a digital manner. Digital stopwatch representation 636 optionally includes a minutes portion (far-left portion), a seconds portion (middle portion), and a $\frac{1}{10}^{th}$ second portion (far-right portion), though it is understood that different structures for digital stopwatch representation 636 are possible. Selection of "lap" button 606 optionally delineates and defines laps similar to as described previously with reference to FIGS. 6A-6M.

Figure 6O:
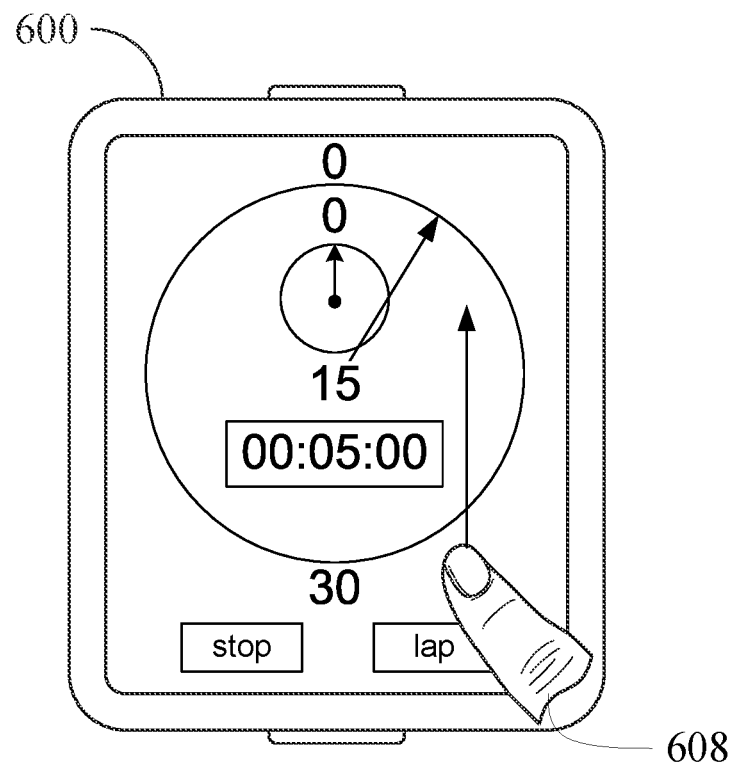

As before, a user may wish to view a list of lap times in addition to the analog lap time representation discussed above. In some embodiments, a list of lap times is optionally displayed in response to detection of a specified input at device 600 (e.g., a specified input on the touch-sensitive surface of device 600). FIG. 6O illustrates an exemplary input detected at device 600 for displaying a list of lap times that have been delineated and defined by selection of "lap" button 606. As before, in the embodiment illustrated, a vertical swipe by finger 608 has been detected on the touch-sensitive surface of device 600. The vertical swipe may be detected at any location on the touch-sensitive surface of device 600.

Figure 6P:
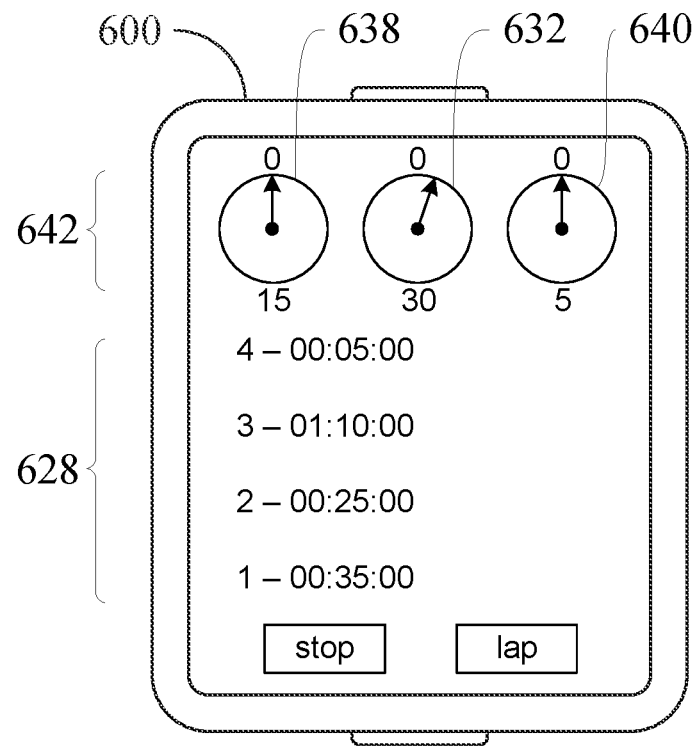

FIG. 6P illustrates an exemplary user interface presented by device 600 after detection of the vertical swipe in FIG. 6O. In response to the vertical swipe detected by device 600 in FIG. 6O, display areas of analog dials 632 and/or 638 are optionally reduced so as to allow display of lap time list 628. The reduced-sized analog dials 632 and 638 are optionally displayed in an upper region 642 of the user interface. Analog dials 632 and 638 optionally retain the same timescales they had in FIGS. 6N-6O. An additional analog dial 640 is optionally added to the user interface in region 642. Analog dial 640 optionally has a timescale of 0-1 second in units of $\frac{1}{10}^{th}$ of a second. Analog dial 640 is optionally used to track tenths of a second that have elapsed in a current lap. In some embodiments, the reduction in the display area of analog dials 632 and/or 638, and the addition of analog dial 640, is performed as vertical swipe is being detected on the touch-sensitive surface of device 600. It is understood that the timescale of 0-1 second for analog dial 640 is exemplary only, and does not limit the scope of the disclosure.

The user interface also optionally includes lap time list 628. Lap time list 628 optionally includes the lap number for each lap, and the lap time for each lap. Lap time list 628 may be scrolled vertically up and down in response to vertical swipe gestures detected on the touch-sensitive surface of device 600. The user interface illustrated in FIG. 6P thus allows a user to view the current lap time as an analog lap time representation (in region 642), and allows the user to view a list of lap times (lap time list 628).

Figure 6Q:
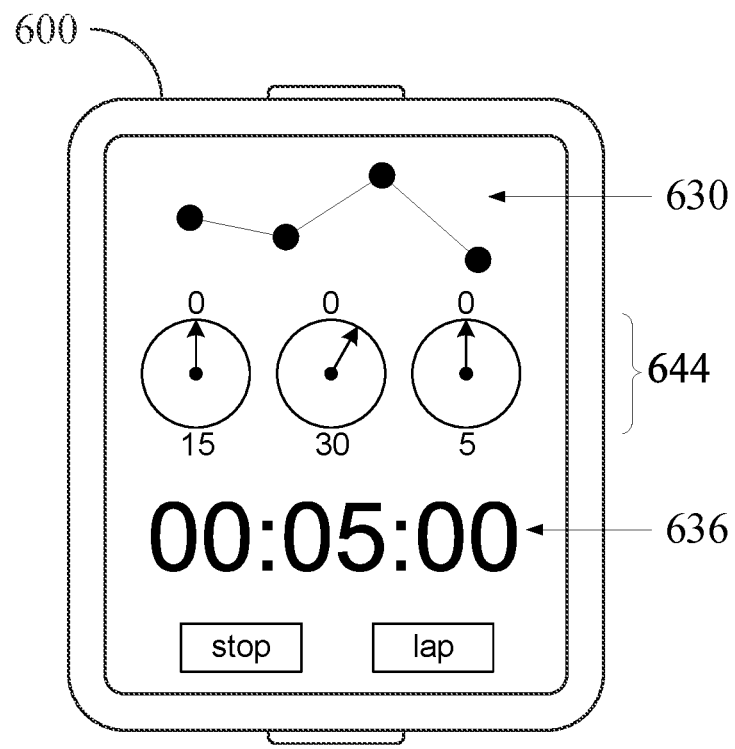

As stated above, the embodiments described with reference to FIGS. 6A-6M are optionally associated with a first stopwatch view (e.g., a graph stopwatch view), and the embodiments described with reference to FIGS. 6N-6P are optionally associated with a second stopwatch view (e.g., an analog stopwatch view). FIG. 6Q illustrates an exemplary user interface presented by device 600 for displaying lap times in a third stopwatch view (e.g., a hybrid stopwatch view). The hybrid stopwatch view can include aspects of the graph stopwatch view and the analog stopwatch view. Reduced-size lap time representations 630 can display the heretofore recorded lap times, including the current lap time, as discussed above with respect to FIGS. 6A-6M. Analog dials 644 can display the current lap time as discussed above with respect to FIGS. 6N-6P. Finally, digital stopwatch representation 636 can display the current lap time in a digital manner.

In some embodiments, the units of digital stopwatch representation 636 align spatially with the units of analog dials 644. That is, the left-most dial of analog dials 644 optionally displays minutes, as does the left-most portion of digital stopwatch representation 636; the middle dial of analog dials 644 optionally displays seconds, as does the middle portion of digital stopwatch representation 636; and the right-most dial of analog dials 644 optionally displays $1/10^{th}$ of a second, as does the right-most portion of digital stopwatch representation 636.

It is noted that although FIGS. 6A-6Q illustrate various user interfaces of device 600, the described techniques may be extended to cover other devices, such as devices 100, 300, and/or 500 (FIGS. 1A, 3A, and 5A). That is to say, various electronic devices may display the user interfaces described in FIGS. 6A-6Q. For brevity, those details are not explicitly discussed here. Further, it is understood that the order of user interfaces and operations described with reference to FIGS. 6A-6Q is exemplary only, and does not limit the scope of the disclosure. For example, the vertical swipe in FIG. 6L could have instead been inputted at FIG. 6F to similarly display a list of lap times.

2. Adjusting Timescales

Multifunction devices, such as devices 100, 300, and/or 500 (FIGS. 1A, 3A, and/or may provide various timing or stopwatch functionalities. As part of these functionalities, these devices may display timing elements having certain timescales. A user may adjust the timescales of the timing elements in various ways. The embodiments described below are directed to multifunction device(s) in which the timescales of timing elements may be adjusted by a user.

Figure 7A:
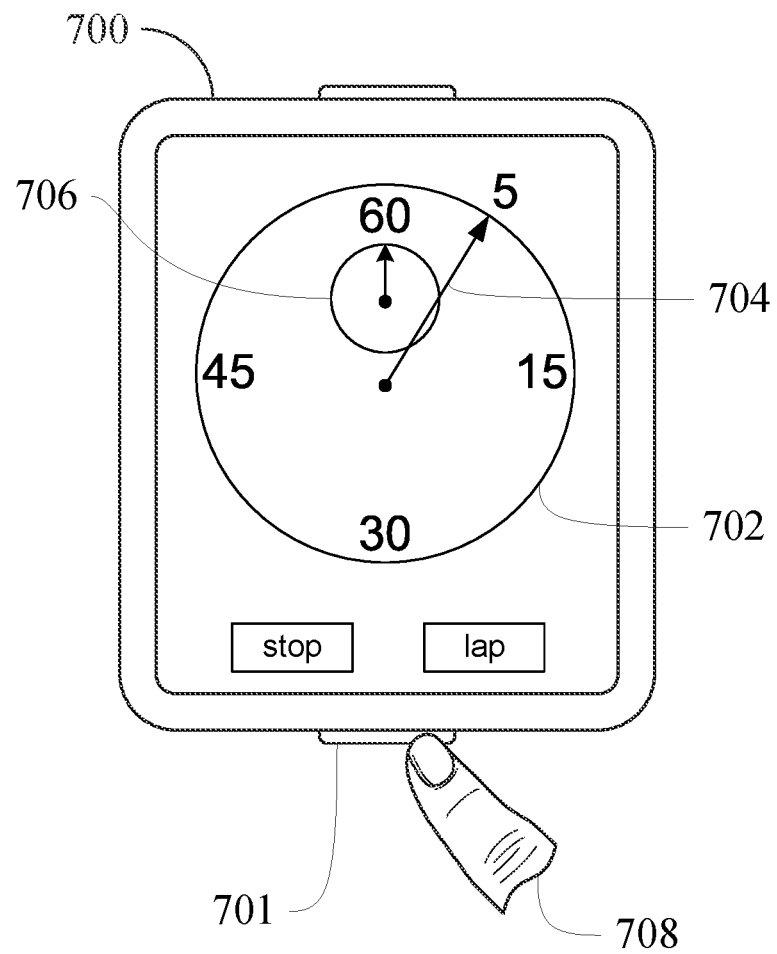
FIGS. 7A-7D illustrate exemplary user interface(s) for updating the timescale(s) of lap time representation(s) in the user interface(s) of electronic device(s).

FIG. 7A illustrates exemplary electronic device 700 and exemplary associated user interface. Electronic device 700 may be any one of devices 100, 300, and/or 500 (FIGS. 1A, 3A, and/or 5A). In the illustrated embodiment, device 700 is a wearable device. In some embodiments, device 700 provides one or more stopwatch functionalities, one of which may be adjusting the timescales of stopwatch representations (e.g., adjusting the timescale of an analog stopwatch representation, adjusting the timescale of a digital stopwatch representation, etc.). Device 700 optionally displays one or more user interfaces for adjusting such timescales.

The user interface displayed by device 700 in FIG. 7A optionally includes analog stopwatch representation 702 for representing a current lap time. Analog stopwatch representation 702 optionally has a specified timescale—in this case, 0-60 seconds—and optionally includes hand 704, which is optionally positioned with respect to the specified timescale in accordance with the current lap time. In the illustrated embodiment, hand 704 is positioned on the timescale at a position corresponding to five seconds—the elapsed time of the current lap.

Analog stopwatch representation 702 optionally also includes analog stopwatch representation 706. Analog stopwatch representation 706 optionally has a timescale different than analog stopwatch representation 702 for representing the current lap time. For example, analog stopwatch representation optionally has a timescale of 0-30 minutes (not illustrated for ease of description). The timescales provided for analog stopwatch representations 702 and 706 are exemplary only, and do not limit the scope of the disclosure.

A user may wish to adjust the timescales of analog stopwatch representation 702 and/or analog stopwatch representation 706. Adjusting of the above timescales may be accomplished in response to detection of a specified input at device 700. For example, a rotational input of rotatable input mechanism 701 on device 700 optionally allows for adjusting of the timescales of analog stopwatch representation 702 and/or analog stopwatch representation 706. In the embodiment illustrated in FIG. 7A, finger 708 is providing a rotational input to rotatable input mechanism 701.

Figure 7B:
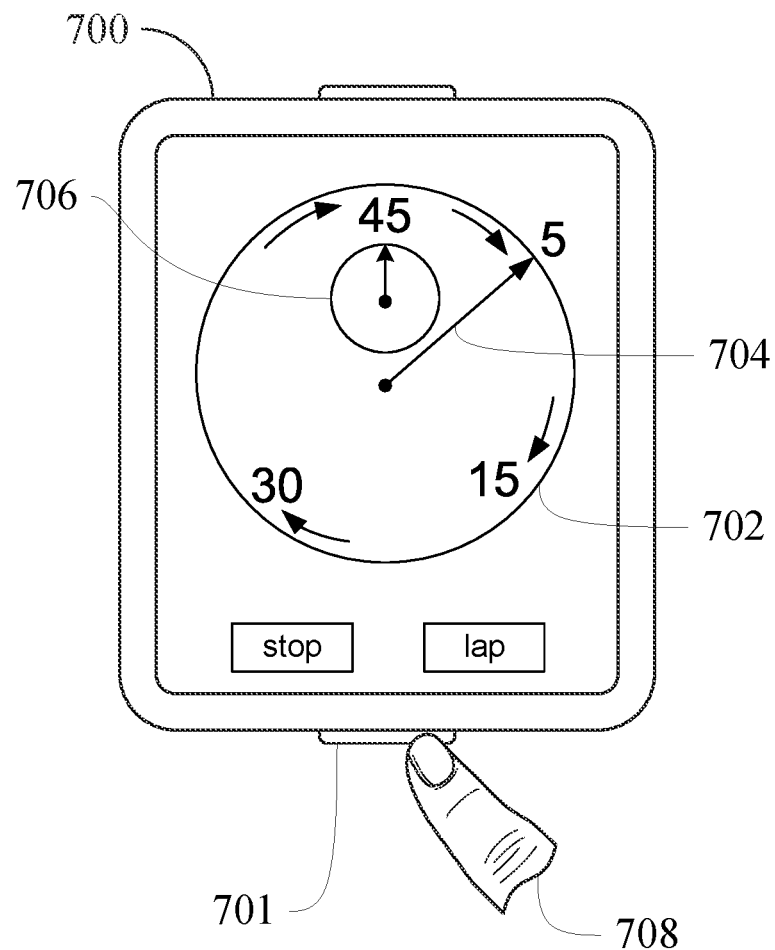

FIG. 7B illustrates an exemplary user interface presented by device 700 while the rotational input is detected at rotatable input mechanism 701 in FIG. 7A. Finger 708 can continue to provide rotational input at rotatable input mechanism 701 in FIG. 7B. The amount of rotational input detected at rotatable input mechanism 701 so far optionally corresponds to an amount of input for changing the timescale of analog stopwatch representation 702 from 0-60 seconds (in FIG. 7A) to 0-45 seconds (in FIG. 7B). In response to the rotational input detected so far, the timescale of analog stopwatch representation 702 optionally changes in accordance with the rotational input as the rotational input is detected. For example, the timescale displayed in FIG. 7A optionally "stretches" (e.g., shifts in a circular manner) as the rotational input is detected at rotatable input mechanism 701, by an amount defined by a correspondence of an amount of rotational input to an amount of timescale change. For example, half a rotation of rotatable input mechanism 701 may correspond to increasing or decreasing a timescale by 50%.

In conjunction with the change in the timescale of analog stopwatch representation 702, the position of hand 704 with respect to the updated timescale is optionally updated so as to maintain the correspondence of the position of hand 704 to the current lap time (in this case, five seconds).

In some embodiments, the timescale of analog stopwatch representation 706 is optionally similarly updated in response to detection of the rotational input at rotatable input mechanism 701. In some embodiments, the timescale of analog stopwatch representation 706 is optionally concurrently updated with the updating of the timescale of analog stopwatch representation 702 (not illustrated for ease of description). For example, in the illustrated embodiment, the timescale of analog stopwatch representation 706 may be changed from 0-30 minutes (in FIG. 7A) to 0-22.5 minutes (in FIG. 7B) in accordance with the amount of rotational input detected at rotatable input mechanism 701.

Figure 7C:
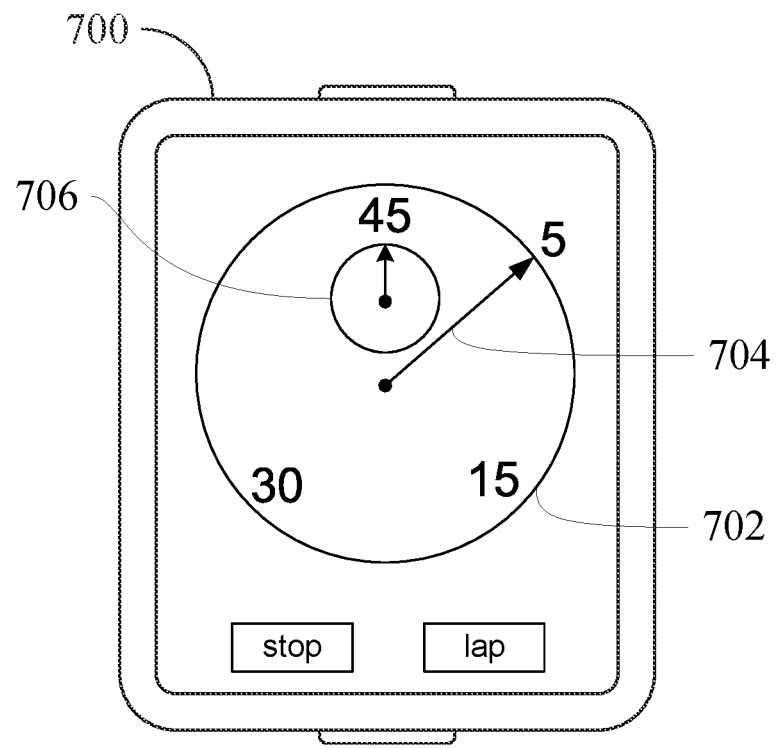

FIG. 7C illustrates an exemplary user interface presented by device 700 after cessation of the rotational input detected at rotatable input mechanism 701 in FIG. 7B. In some embodiments, after cessation of the rotational input at rotatable input mechanism 701, the timescales of analog stopwatch representations 702 and/or 706 remain as they last were when the rotational input was last detected. For example, in the embodiment illustrated, the rotational input was terminated when the timescale of analog stopwatch representation 702 had been changed to 0-45 seconds. Thus, in some embodiments, the timescale of analog stopwatch representation 702 remains at 0-45 seconds after cessation of the rotational input detected at rotatable input mechanism 701. The timescale of analog stopwatch representation 706 optionally similarly remains after cessation of the rotational input detected at rotatable input mechanism 701 (not illustrated for ease of description).

Figure 7D:
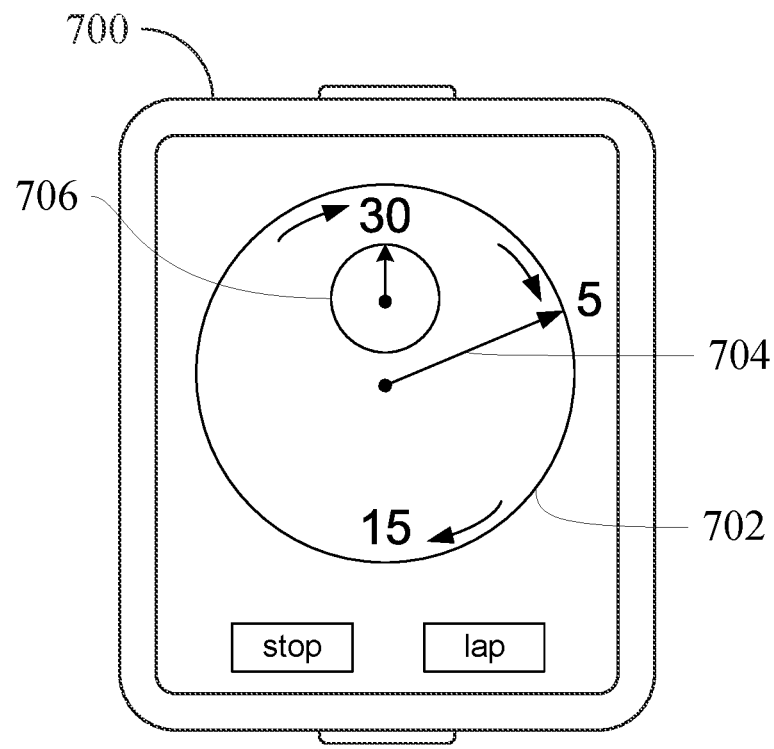

FIG. 7D illustrates an alternative exemplary user interface presented by device 700 after cessation of the rotational input detected at rotatable input mechanism 701 in FIG. 7B. In some embodiments, after cessation of the rotational input at rotatable input mechanism 701, the timescales of analog stopwatch representations 702 and/or 706 "snap" to the closest predefined timescale of a plurality of predefined timescales that correspond to the direction of the rotational input (e.g., whether the rotational input is increasing or decreasing the timescales of analog stopwatch representations 702 and/or 706).

For example, analog stopwatch representation 702 is optionally associated with four predefined timescales: 0-60 seconds, 0-30 seconds, 0-6 seconds and 0-3 seconds; similarly, analog stopwatch representation 706 is optionally associated with four predefined timescales: 0-minutes, 0-15 minutes, 0-3 minutes and 0-2 minutes. When the rotational input is terminated at rotatable input mechanism 701, the timescale of analog stopwatch representation 702 optionally "snaps" to 0-30 seconds instead of remaining at 0-45 seconds (as illustrated in FIG. 7D), because 0-45 seconds is optionally not one of the four predefined timescales that analog stopwatch representation 702 is associated with, and because 0-30 seconds optionally corresponds to the direction of the rotational input (decreasing of the timescale of analog stopwatch representation 702). The position of hand 704 is optionally also updated in correspondence with the "snapping" of the timescale of analog stopwatch representation 702. Though not illustrated, it is understood that the timescale of analog stopwatch representation 706 optionally also "snaps" to a predefined timescale. It is understood that the provided predefined timescales are exemplary only, and do not limit the scope of the disclosure.

It is noted that although FIGS. 7A-7D illustrate various user interfaces of device 700, the described techniques may be extended to cover other devices, such as devices 100, 300, and/or 500 (FIGS. 1A, 3A, and 5A). That is to say, various electronic devices may display the user interfaces described in FIGS. 7A-7D. For brevity, those details are not explicitly discussed here.

3. Setting Timer Duration

Multifunction devices, such as devices 100, 300, and/or 500 (FIGS. 1A, 3A, and/or may provide various timing functionalities. As part of these functionalities, these devices may provide for a countdown timer to countdown from a specified current duration setting. A user may adjust the current duration setting in various ways. The embodiments described below are directed to multifunction device(s) in which the current duration setting of a timer may be adjusted by a user.

Figure 8A:
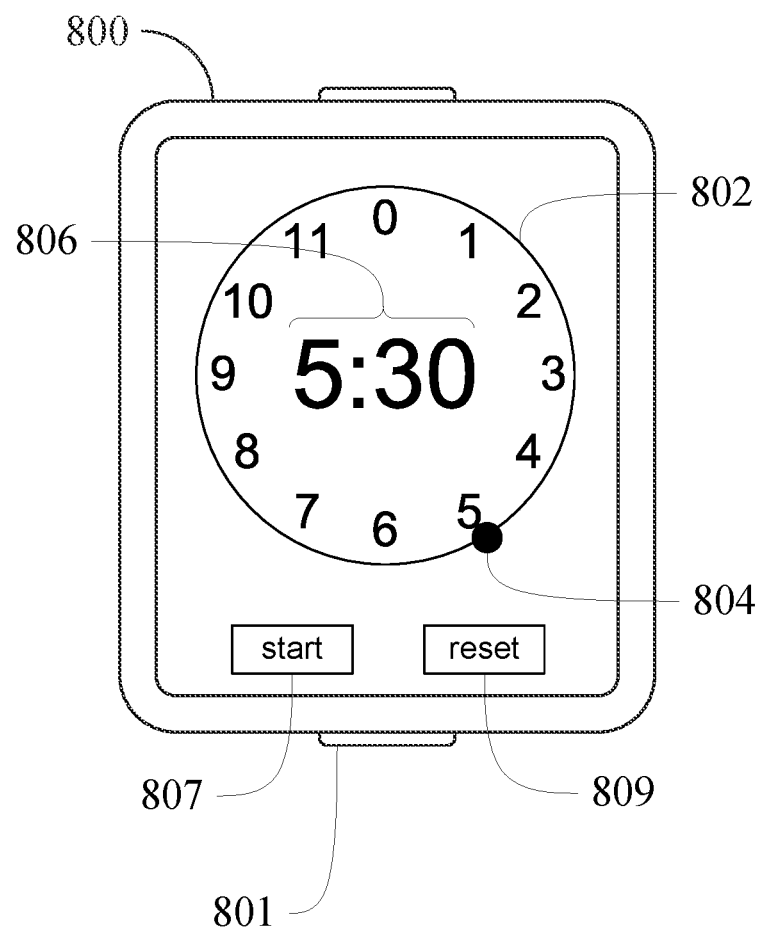
FIGS. 8A-8K illustrate exemplary user interface(s) for updating current duration setting(s) of timer(s) in the user interface(s) of electronic device(s).

FIG. 8A illustrates exemplary electronic device 800 and an exemplary associated user interface. Electronic device 800 may be any one of devices 100, 300, and/or 500 (FIGS. 1A, 3A, and/or 5A). In the illustrated embodiment, device 800 is a wearable device. In some embodiments, device 800 provides one or more timer functionalities, one of which may be setting a timer duration. Device 800 optionally displays one or more user interfaces for setting the timer duration.

The user interface displayed by device 800 in FIG. 8A optionally includes a timer representation having analog representation 802 and digital representation 806. Analog representation 802 optionally has a specified timescale (in this case, 0-12 hours), and includes current duration indicator 804 for representing a current duration setting (in this case, five hours and 30 minutes) on the specified timescale. In some embodiments, current duration indicator 804 represents the value of a specified unit of the current duration setting that corresponds to the unit of the timescale of analog representation 802 (in this case, hours). In some embodiments, current duration indicator 804 represents the entire current duration setting; in such embodiments, current duration indicator 804 would optionally be positioned between the 5 and the 6 on the timescale of analog representation 802 to represent the current duration setting of five hours and 30 minutes.

Digital representation 806 optionally includes an hours portion for representing the hours unit of the current duration setting (in this case, five hours), and a minutes portion for representing the minutes unit of the current duration setting (in this case, 30 minutes). It is understood that other structures for digital representation 806 are possible. Analog representation 802 and digital representation 806 optionally represent the current duration setting in a coordinated manner (e.g., if the current duration setting is changed, digital representation 806 and analog representation 802 are optionally both updated to reflect the change).

The user interface in FIG. 8A also optionally includes button 807 to start counting down from the current duration setting, and button 809 for resetting the countdown to the initial current duration setting value.

A user may wish to adjust the current duration setting of analog representation 802 and/or digital representation 806. Adjusting of the current duration setting may be accomplished in response to detection of a specified input at device 800. For example, a rotational input of rotatable input mechanism 801 on device 800 optionally allows for adjusting of the current duration setting.

Figure 8B:
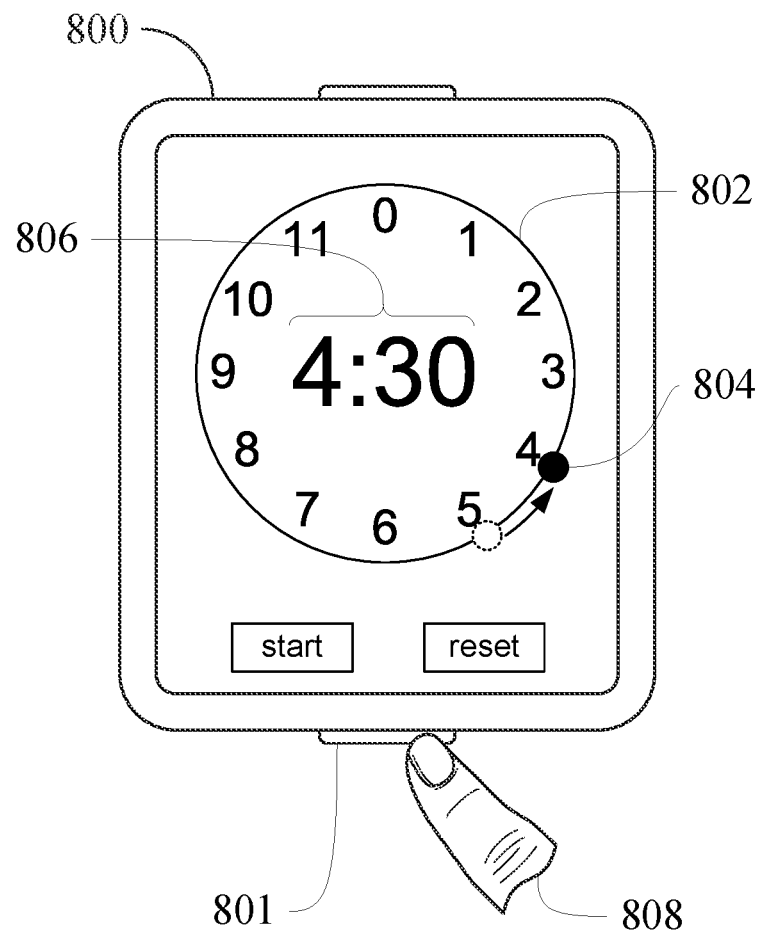

FIG. 8B illustrates an exemplary user interface presented by device 800 while a rotational input is detected at rotatable input mechanism 801. Finger 808 is optionally providing a rotational input to rotatable input mechanism 801. In response to the rotational input, the current duration setting is optionally changed in accordance with the rotational input. In the illustrated embodiment, the rotational input has reduced the current duration setting from five hours and 30 minutes to four hours and 30 minutes. The updated current duration setting is optionally reflected by digital representation 806. The updated current duration setting is optionally also reflected by the changed position of current duration indicator 804 on analog representation 802. As illustrated, current duration indicator 804 has moved from being positioned at the 5 to being positioned at the 4 on the timescale of analog representation 802 in accordance with the rotational input. In some embodiments, current duration indicator 804 is moved as the rotational input is detected.

In some embodiments, analog representation 802 and/or digital representation 806 can be presented in 12-hour format (e.g., as illustrated in FIG. 8A) or 24-hour format (not illustrated). While device 800 is displaying user interface analog representation 802 and/or digital representation 806, the device can detect a touch input on its touch-sensitive surface. In accordance with a touch input that has a characteristic intensity greater than a predetermined threshold intensity, device 800 presents one or more affordances for selecting between 12- and 24-hour display formats. The affordance(s) optionally indicate the currently selected display format by highlighting the current format selection. In some embodiments, analog representation 802—when in 24-hour format—displays twenty-four marked increments along the circumference of analog representation 802 (instead of twelve as shown in FIG. 8A). In some embodiments, analog representation 802 in 24-hour format displays twelve, two-hour increments (e.g., clock face markers are labeled 0, 2, 4, and so forth). In accordance with a touch input that has a characteristic intensity lower that the predetermined threshold intensity, device 800 provides user interface responses such as those described below with reference to FIG. 8C-8G.

Figure 8C:
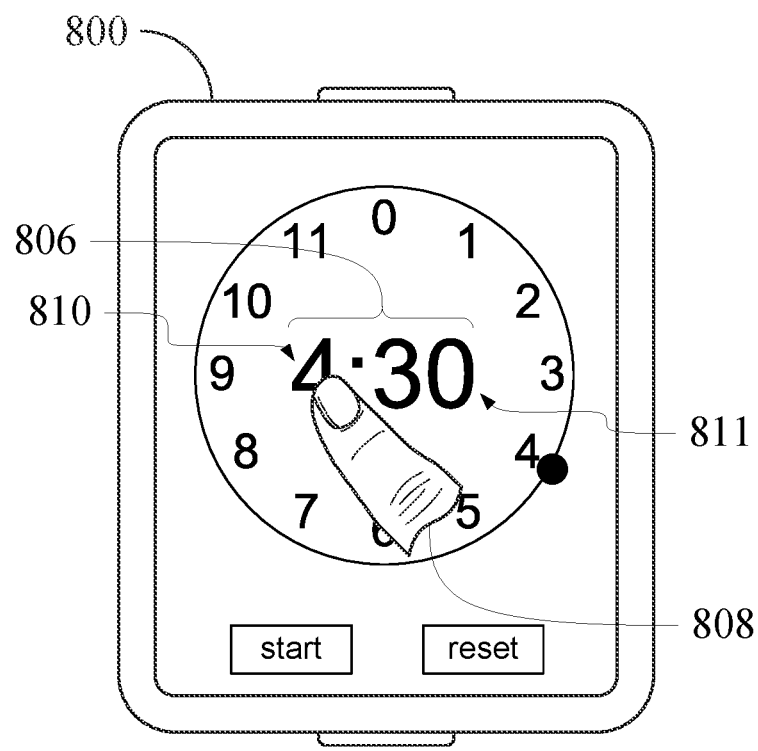

In some embodiments, before supplying the rotational input at rotatable input mechanism 801, a user optionally specifies which unit of the current duration setting is to be changed by the rotational input. FIG. 8C illustrates a user's designation of the hours unit of the current duration setting to be changed by subsequent rotational inputs detected at rotatable input mechanism 801. As stated before, digital representation 806 optionally has hours portion 810 and minutes portion 811. One of the two portions of digital representation may be selected or designated to specify which unit of the current duration setting (e.g., hours or minutes) will be changed by subsequent rotational inputs detected at rotatable input mechanism 801. For example, hours portion 810 may be selected (as illustrated) to specify that the hours unit of the current duration setting will be changed by subsequent rotational input detected at rotatable input mechanism 801. Alternatively, minutes portion 811 may be selected to specify that the minutes unit of the current duration setting will be changed by subsequent rotational input detected at rotatable input mechanism 801. As illustrated, finger 808 has selected hours portion 810 of digital representation 806.

Figure 8D:
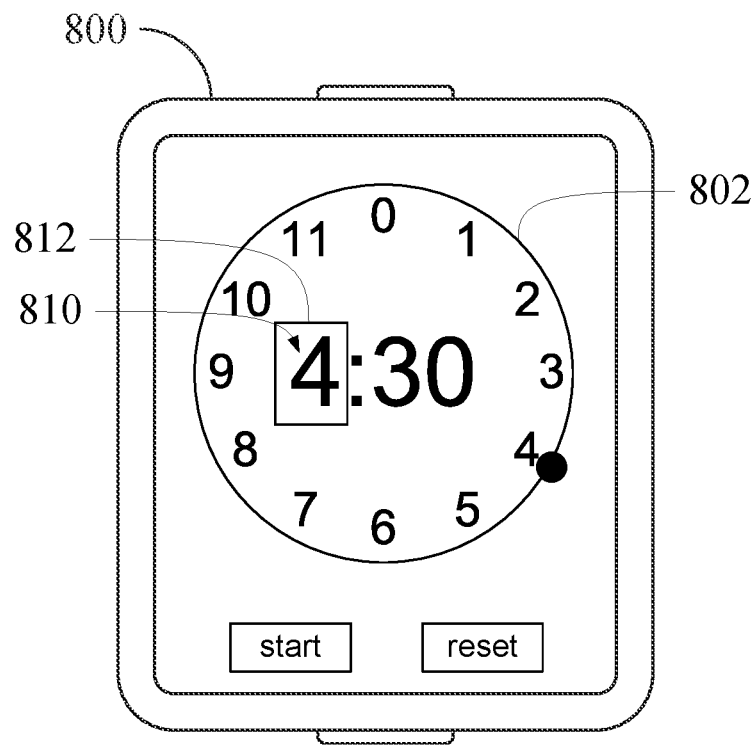

FIG. 8D illustrates an exemplary user interface presented by device 800 after selection of hours portion 810 in FIG. 8C. In response to the selection of hours portion 810, a visual cue is optionally displayed in the user interface to signify that hours portion 810 has been selected. For example, hours portion 810 is optionally highlighted, begins flashing, or is displayed within a border (or any other visual cue is provided for signifying the selection of hours portion 810). In the illustrated embodiment, a box 812 is displayed around hours portion 810 to signify its selection.

Additionally, the timescale of analog representation 802 is optionally updated in response to the selection of hours portion 810 to be a timescale associated with hours portion 810. For example, the timescale of analog representation 802 is optionally updated to be 0-12 hours in response to selection of hours portion 810. Other timescales may alternatively be associated with hours portion 810 instead of the 0-12 hour timescale. If the timescale of analog representation 802 is already 0-12 hours, the timescale need not be updated in response to the selection of hours portion 810 (as is the case in FIG. 8D).

Figure 8E:
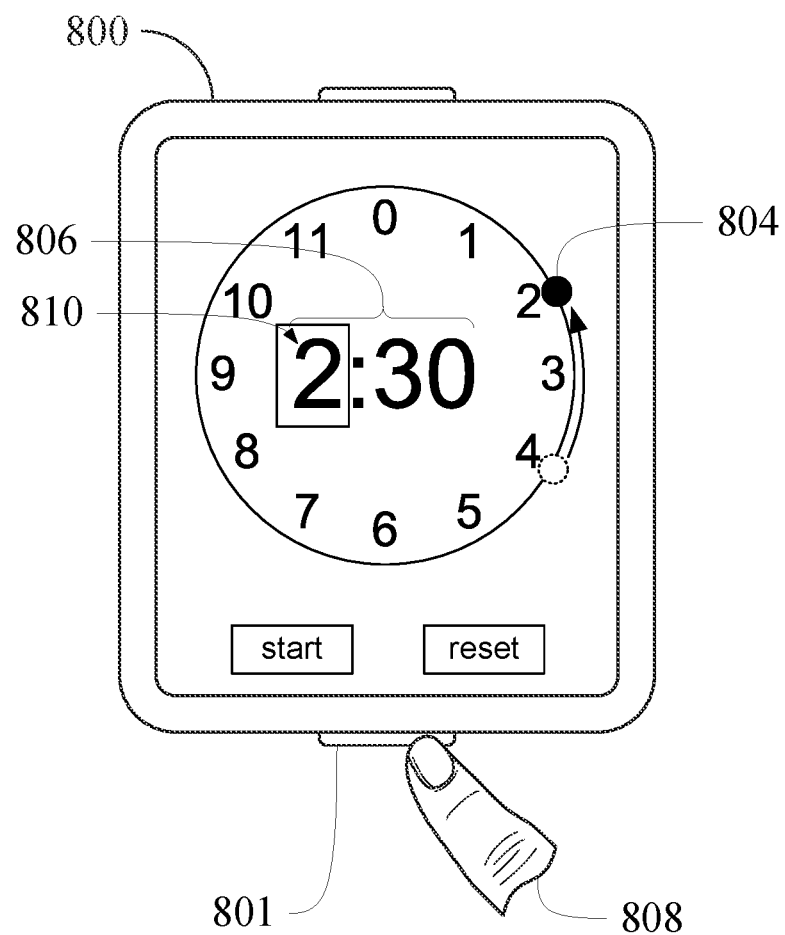

FIG. 8E illustrates an exemplary user interface presented by device 800 in response to detection of rotational input at rotatable input mechanism 801. Finger 808 has provided a rotational input at rotatable input mechanism 801. Because hours portion 810 is selected, rotational input at rotatable input mechanism 801 optionally changes the hours unit of the current duration setting. Digital representation 806 optionally reflects this change (in this case, change from four to two hours). Additionally, current duration indicator 804 is optionally updated to reflect the change in the hours unit of the current duration setting, as illustrated.

Figure 8F:
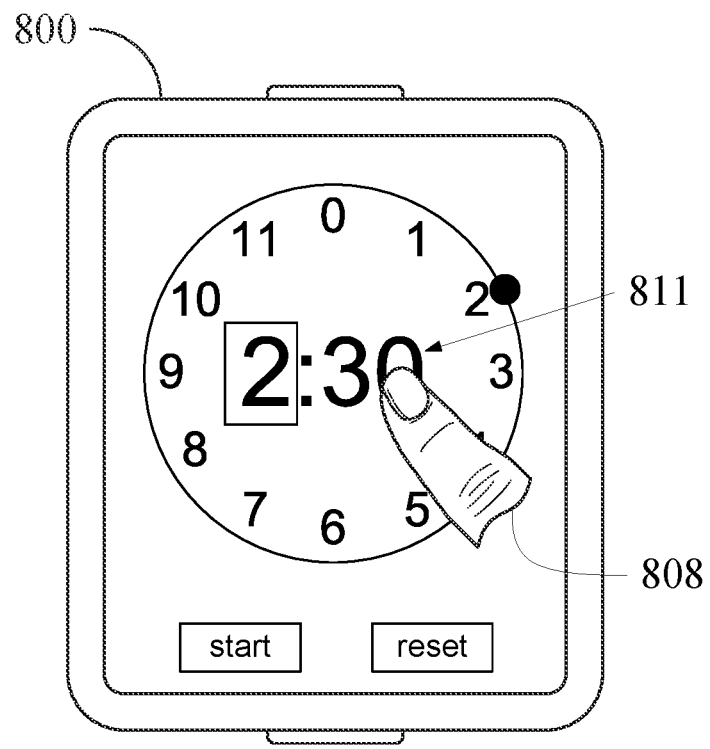

FIG. 8F illustrates a user's designation of the minutes unit of the current duration setting to be changed by subsequent rotational inputs detected at rotatable input mechanism 801. Hours portion 810 may be currently selected, as discussed previously. As illustrated, finger 808 has selected minutes portion 811 of digital representation 806 to designate that the minutes unit of the current duration setting will be changed by subsequent rotational inputs detected at rotatable input mechanism 801.

Figure 8G:
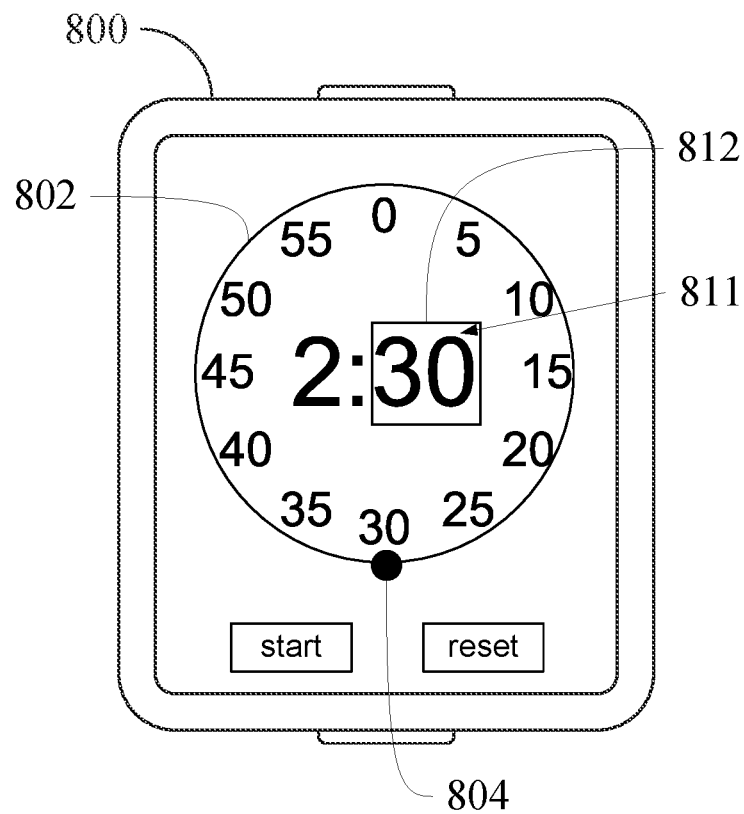

FIG. 8G illustrates an exemplary user interface presented by device 800 after selection of minutes portion 811 in FIG. 8F. In response to the selection of minutes portion 811, a visual cue is optionally displayed in the user interface to signify that minutes portion 811 has been selected. For example, minutes portion 811 is optionally highlighted, begins flashing, or is displayed within a border (or any other visual cue is provided for signifying the selection of minutes portion 811). In the illustrated embodiment, a box 812 is displayed around minutes portion 811 to signify its selection.

Additionally, the timescale of analog representation 802 is optionally updated in response to the selection of minutes portion 811 to be a timescale associated with minutes portion 811. For example, the timescale of analog representation 802 is optionally updated to be minutes in response to selection of minutes portion 811, as illustrated. Other timescales may alternatively be associated with minutes portion 811 instead of the 0-60 minute timescale. If the timescale of analog representation 802 is already 0-60 minutes, the timescale need not be updated to reflect the selection of minutes portion 811.

Figure 8H:
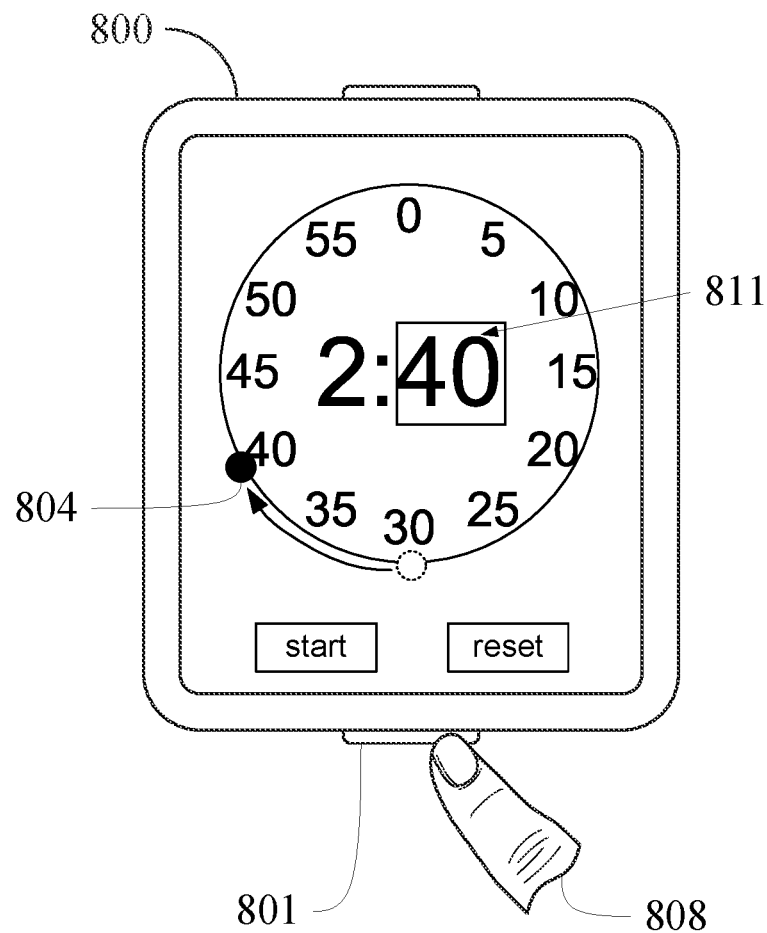

FIG. 8H illustrates an exemplary user interface presented by device 800 in response to detection of rotational input at rotatable input mechanism 801. Finger 808 has provided a rotational input at rotatable input mechanism 801. Because minutes portion 811 is selected, rotational input at rotatable input mechanism 801 optionally changes the minutes unit of the current duration setting. Digital representation 806 optionally reflects this change (in this case, change from 30 to 40 minutes). Additionally, current duration indicator 804 is optionally updated to reflect the change in the minutes unit of the current duration setting, as illustrated.

Figure 8I:
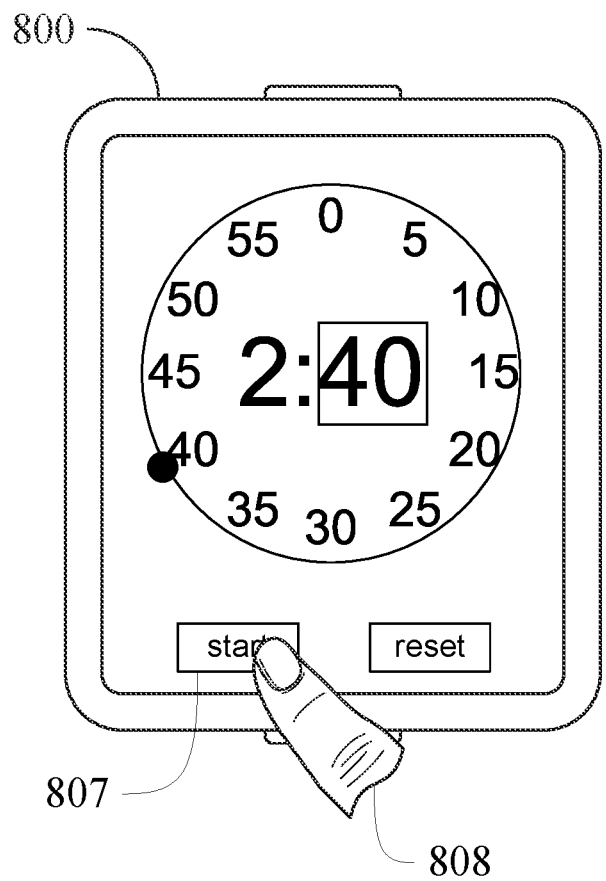

FIG. 8I illustrates a user's starting of a timer countdown from the current duration setting. As discussed previously, selection of button 807 optionally starts a timer countdown from the current duration setting. As illustrated, finger 808 has selection "start" button 807.

Figure 8J:
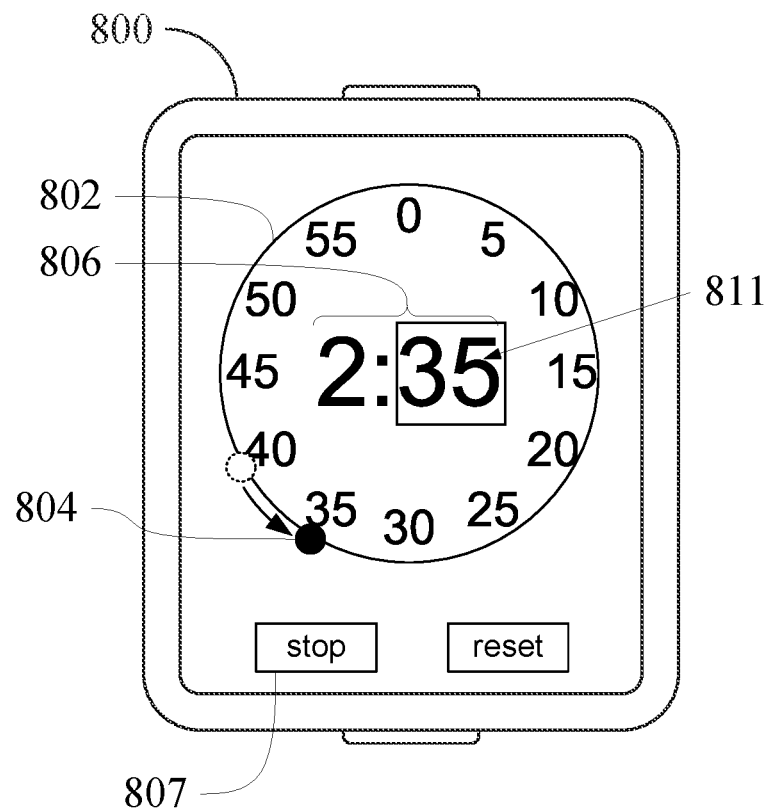

FIG. 8J illustrates an exemplary user interface presented by device 800 after selection of "start" button 807 in FIG. 8I. Button 807 optionally changes from a "start" button in FIG. 8I to a "stop" button in FIG. 8J for stopping the timer countdown initiated in FIG. 8I. Additionally, digital representation 806 is optionally updated to reflect the time elapsed since selection of "start" button 807 in FIG. 8I. In the illustrated embodiment, five seconds have elapsed since selection of "start" button 807 in FIG. 8I. Additionally, current duration indicator 804 is optionally also updated to reflect the time elapsed, as illustrated by its change from its position next to 40 in the timescale of analog representation 802 to its position next to 35 in the timescale of analog representation 802.

Figure 8K:
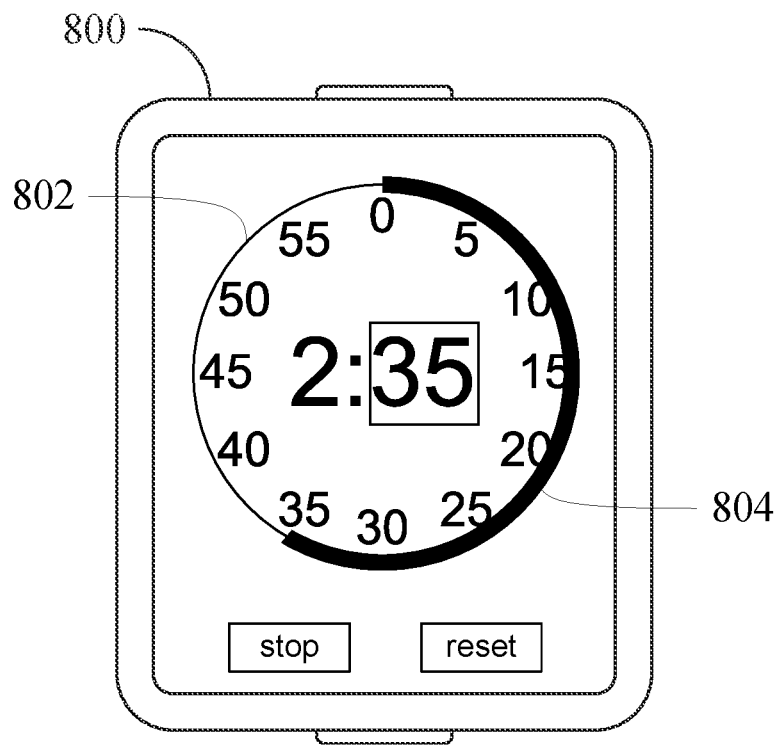

FIG. 8K illustrates an alternative form for current duration indicator 804. In some embodiments, instead of being a dot (as illustrated in FIGS. 8A-8J), current duration indicator

804 is optionally a region having a filled area that extends from a position on the timescale of analog representation 802 that corresponds to 0, to a position on the timescale of analog representation 802 that corresponds to the value of the currently-selected unit of the current duration setting (in this case, 35 minutes). In all other respects, current duration indicator 804 of FIG. 8K optionally behaves in a manner similar to current duration indicator 804 of FIGS. 8A-8J. For example, current duration indicator 804 optionally expands or contracts around the perimeter of analog representation 802 as the minutes (or hours) unit of the current duration setting is changed, whether due to a rotational input detected at rotatable input mechanism 801 or a timer countdown.

It is noted that although FIGS. 8A-8K illustrate various user interfaces of device 800, the described techniques may be extended to cover other devices, such as devices 100, 300, and/or 500 (FIGS. 1A, 3A, and 5A). That is to say, various electronic devices may display the user interfaces described in FIGS. 8A-8K. For brevity, those details are not explicitly discussed here. Further, it is understood that the order of user interfaces and operations described with reference to FIGS. 8A-8K is exemplary only, and does not limit the scope of the disclosure. For example, a user may have selected and changed the minutes portion of digital timer representation 806 before selecting and changing the hours portion of digital timer representation 806.

Figure 9B:
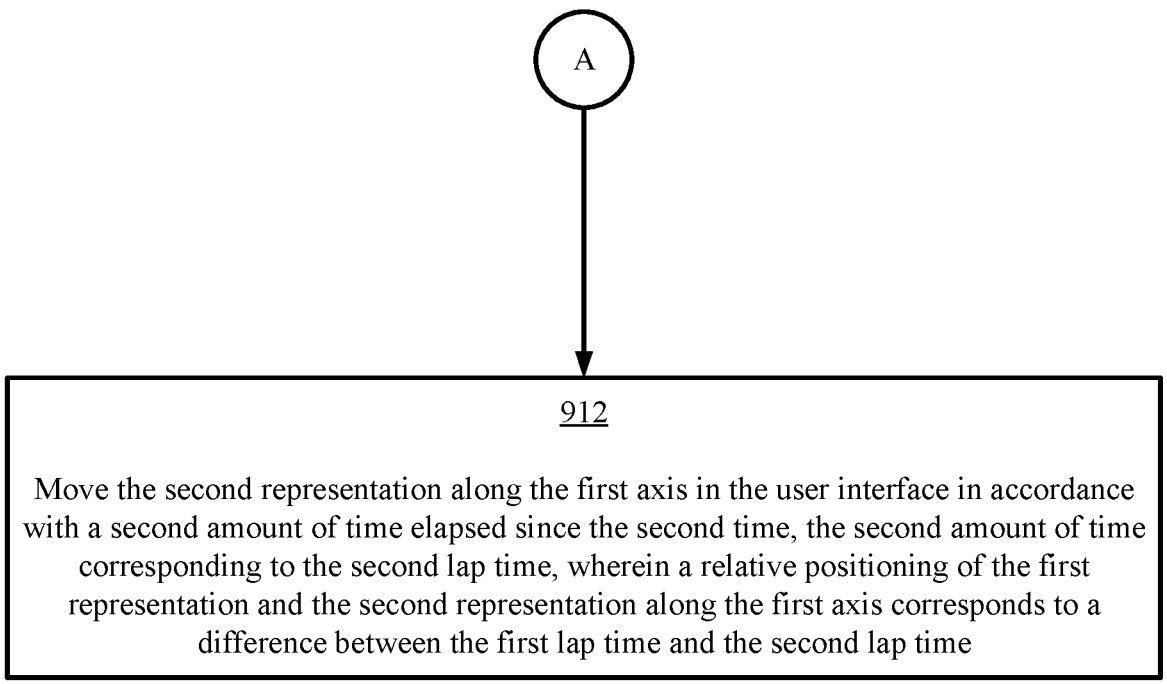

FIGS. 9A-9B are a flow diagram illustrating process 900 for representing lap times in a user interface of an electronic device. Process 900 may be carried out by electronic devices such as devices 100, 300, and/or 500 (FIGS. 1A, 3A, 5A) in various embodiments. At block 902, the electronic device displays (e.g., on a touch-sensitive display), at a first time, a first representation (e.g., a first dot) of a first lap time in a user interface.

At block 904, the electronic device moves the first representation along a first axis (e.g., a vertical axis) in the user interface in accordance with a first amount of time elapsed since the first time, the first amount of time corresponding to the first lap time (e.g., moves the first representation in a continuous manner along the first axis as time continues to elapse after the first time). At block 906, while moving the first representation, the electronic device detects a first lap input at the device (e.g., detects selection of a lap button in the user interface on the touch-sensitive display) at a second time.

At block 908, in response to the first lap input, the electronic device: ceases movement of the first representation along the first axis, and displays a second representation (e.g., a second dot) of a second lap time in the user interface at block 910. For example, in response to the first lap input, the electronic device freezes the first representation at the location in the user interface at which the first representation was located when the first lap input was detected, and adds the second representation to the user interface.

At block 912, the electronic device moves the second representation along the first axis (e.g., a vertical axis) in the user interface in accordance with a second amount of time elapsed since the second time, the second amount of time corresponding to the second lap time (e.g., moves the second representation in a continuous manner along the first axis as time continues to elapse after the second time). In some embodiments, a relative positioning of the first representation and the second representation along the first axis corresponds to a difference between the first lap time and the second lap time. For example, in some embodiments, the second representation will be shown below the first representation while the second lap time is less than the first lap time, and will move in the direction of the first axis as the second lap time gets closer to the first lap time; as the second lap time exceeds the first lap time, the second representation will be shown above the first representation, and will continue to move in the direction of the first axis as the second lap time increasingly exceeds the first lap time.

In some embodiments, the first and second representations are separated by a distance (e.g., a constant distance) in a direction orthogonal to the first axis (e.g., horizontally separated) in the user interface. In some embodiments, the first and second representations are connected by a line in the user interface.

In some embodiments, the first and second representations comprise a first stopwatch view. The electronic device optionally detects a view change input at the device (e.g., an input on a touch-sensitive display to switch to a different stopwatch view). In response to the view change input, the electronic device optionally displays a second stopwatch view (e.g., an analog stopwatch view, a digital stopwatch view, etc.), different from the first stopwatch view, the second stopwatch view including information about the first lap time and the second lap time. For example, information about the first lap time, corresponding to the first representation, and the second lap time, corresponding to the second representation, is optionally preserved when switching from the first stopwatch view to the second stopwatch view. The second stopwatch view optionally displays this information in a manner different from the first and second representations of the first stopwatch view. For example, the second stopwatch view is optionally a digital stopwatch view that displays the first and second lap times as part of a list of lap times.

In some embodiments, the electronic device detects a lap time display input on a touch-sensitive surface of the device (e.g., on a touch-sensitive display of the device), the lap time display input comprising a contact and movement of the contact (e.g., a vertical flick) on the touch-sensitive surface. In response to the lap time display input, the electronic device optionally displays a list of lap times including the first lap time and the second lap time. In some embodiments, in response to the lap time display input, the electronic device modifies the display of the first and second representations so as to reduce a display area of the first and second representations in the user interface (e.g., reducing the display area of the first and second representations, and displaying the list of lap times at least partially in the area in the user interface made available as a result of reducing the display area of the first and second representations).

In some embodiments, a first dimension of the user interface along the first axis is displayed at a first timescale, the first timescale having a first maximum lap time (e.g., the vertical dimension of the user interface, and the corresponding timescale, are such that a maximum lap time of "the first maximum lap time" can be displayed. For example, the vertical dimension and the corresponding timescale can be such that a maximum lap time of one minute can be displayed), and the second lap time exceeds the first maximum lap time (e.g., the second lap time is longer than one minute). While the second lap time exceeds the first maximum lap time, the electronic device optionally detects a second lap input at the device (e.g., detecting selection of a lap button in the user interface on a touch-sensitive display) at a third time. In response to the second lap input, the electronic device optionally determines a second timescale having a second maximum lap time greater than the second lap time (e.g., determining a timescale greater than the second lap time so that the second lap time can be displayed on the timescale), and updates the first dimension of the user interface to have the second timescale. For example, updating the first dimension optionally includes updating the location of the first representation in the user interface to maintain the proper relative positioning of the first representation with respect to the second timescale. Additionally, if the timescale is increased, the rate of movement of the first, second, and further representations is optionally decreased to maintain the proper correspondence between movement and elapsed time. In some embodiments, the timescale of the first dimension is updated after detecting the second lap input, and the second representation remains stationary at the maximum point of the first dimension until the timescale is updated.

In some embodiments, the first representation and the second representation provide respective visual cues of their respective lap times. For example, the representation corresponding to the longest lap optionally provides a first visual cue, the representation corresponding to the shortest lap optionally provides a second visual cue. For example, the representation corresponding to the longest lap time is optionally a red dot, and the representation corresponding to the shortest lap time is optionally a green dot. The representation corresponding to the current lap optionally flashes between green and white while its corresponding lap time is shorter than the shortest lap, turns to solid white while its corresponding lap time is longer than the shortest lap but shorter than the longest lap, and solid red while its corresponding lap time is longer than the longest lap. If the representation corresponding to the current lap becomes the longest lap, the previous longest lap, which was optionally solid red, optionally turns solid white when the current lap representation turns solid red. Other colors and/or visual cues can similarly be utilized in this manner.

In some embodiments, the electronic device displays a stopwatch representation (e.g., a digital stopwatch, and/or an analog stopwatch) in addition to the first representation and the second representation, the stopwatch representation including information about the second lap time. For example, the stopwatch representation optionally displays the second lap time at the same time and in addition to the first and second representations. However, the stopwatch representation optionally displays the second lap time in a format different from the first representation and the second representation. For example, the first and second representations may present lap time information in the form of a line graph, while the stopwatch representation may present lap time information—in particular the second lap time information—in the form of a digital stopwatch representation.

In some embodiments, the electronic device detects a second lap input at the device (e.g., detecting selection of a lap button in the user interface on a touch-sensitive display) at a third time, the third time being after the second time. In response to the second lap input, the electronic device optionally determines an average lap time based on the first lap time and the second lap time (e.g., determining an average lap time of some or all of the lap times recorded as representations along the first axis), and displays a representation of the average lap time in the user interface. For example, the electronic device optionally displays a line orthogonal to the first axis at a point on the first axis that corresponds to the average lap time. In this way, the relative positioning of the first/second representations and the average lap time line optionally indicates the relative lengths of the first/second lap times with respect to the average lap time.

In some embodiments, the electronic device, prior to moving the first representation along the first axis (e.g., a vertical axis) in the user interface, measures the first amount of time elapsed since the first time, wherein moving the first representation along the first axis is in accordance with the measured first amount of time, and, prior to moving the second representation along the first axis (e.g., a vertical axis) in the user interface, measures the second amount of time elapsed since the second time, wherein moving the second representation along the first axis is in accordance with the measured second amount of time.

FIG. 10 is a flow diagram illustrating process 1000 for updating the timescale of a lap time representation in a user interface of an electronic device. Process 1000 may be carried out by electronic devices such as devices 100, 300, and/or 500 (FIGS. 1A, 3A, 5A) in various embodiments. At block 1002, the electronic device, which includes a rotatable input mechanism, displays (e.g., on a touch-sensitive display) a first representation (e.g., an analog dial) of a current lap time in a user interface. The first representation has a first timescale (e.g., 0-60 seconds, 0-30 seconds, 0-6 seconds, 0-3 seconds) and includes a first element (e.g., an analog watch/timer hand), the first element positioned with respect to the first timescale in accordance with the current lap time on the first timescale. For example, the analog hand may be positioned at 25 seconds on a 30 second timescale in accordance with a current lap time being 25 seconds, or may be positioned at 5 seconds on the 30 second timescale in accordance with the current lap time being 35 seconds.

At block 1004, while displaying the first representation, the electronic device detects a rotational movement of the rotatable input mechanism. At block 1006, in response to the rotational movement, the electronic device updates the first representation of the current lap time to have a second timescale, different from the first timescale, in accordance with the rotational movement. For example, the electronic device increases or decreases the timescale based on the rotational direction of the rotational input. At block 1006, the electronic device also updates the position of the first element in accordance with the current lap time on the second timescale. For example, if the analog hand was positioned to point at a location corresponding to 25 seconds on a 30 second timescale, when the timescale is changed to 60 seconds, the position of the analog hand will be changed to point to a new location corresponding to 25 seconds on the 60 second timescale.

In some embodiments, updating the first representation to have the second timescale comprises selecting the second timescale from a plurality of predefined timescales (e.g., predefined timescales of 60 seconds, 30 seconds, 6 seconds and 3 seconds). In some embodiments, the rotational movement of the rotatable input mechanism corresponds to a first input timescale, different from each of the plurality of predefined timescales (e.g., the rotational movement of the rotatable input mechanism optionally corresponds to changing the timescale from 60 seconds to 20 seconds), and selecting the second timescale from the plurality of predefined timescales comprises determining which of the plurality of predefined timescales is closest to the first input timescale, and selecting the closest timescale of the predefined timescales as the second timescale. For example, if the rotational movement of the rotatable input mechanism optionally corresponds to changing the timescale from 60 seconds to 20 seconds, selecting 30 seconds as the second timescale as opposed to 6 seconds, because 30 seconds is closer to 20 seconds than is 6 seconds.

In some embodiments, updating the first representation comprises displaying an animation of the first representation changing from the first timescale to the second timescale (e.g., shrinking or stretching the first representation's timescale from the current timescale to the new timescale). In some embodiments, the first representation of the current lap time (e.g., main dial) includes a second representation of the current lap time (e.g., sub-dial), the second representation having a third timescale, different from the first timescale. In response to the rotational movement, the electronic device optionally updates the second representation of the current lap time to have a fourth timescale, different from the second timescale, in accordance with the rotational movement (e.g., increasing or decreasing the timescale of a sub-dial based on the rotational movement of the rotational input and in coordination with changes in the timescale of the main dial. For example, updating a 30 minute sub-dial of a 60 second main dial to be a 15 minute sub-dial of a 30 second main dial).

FIG. 11 is a flow diagram illustrating process 1100 for updating a current duration setting of a timer in a user interface of an electronic device. Process 1100 may be carried out by electronic devices such as devices 100, 300, and/or 500 (FIGS. 1A, 3A, 5A) in various embodiments. At block 1102, the electronic device, which includes a rotatable input mechanism, displays (e.g., on a touch-sensitive display) a timer representation in a user interface. The timer representation includes, at block 1104, an analog representation (e.g., an analog dial), the analog representation including a current duration indicator (e.g., a dot, a line, a filled region) representing a current duration setting (e.g., a current timer countdown setting). The timer representation also includes a digital representation (e.g., hours and minutes) representing the current duration setting.

At block 1106, while displaying the timer representation, the electronic device detects a rotational movement of the rotatable input mechanism. At block 1108, in response to the rotational movement, the electronic device updates the current duration indicator and the digital representation in accordance with the rotational movement. For example, the electronic device updates the current duration indicator in the analog representation and the digital representation in a coordinated manner to reflect the current duration setting as the current duration setting is changed in response to the rotational input.

In some embodiments, prior to detecting the rotational movement of the rotatable input mechanism, the electronic device detects selection of the first portion of the digital representation (e.g., a user optionally selects/touches the hours indicator of the digital representation on a touch-sensitive display), wherein updating the current duration indicator and the digital representation comprises: updating a first unit (e.g., the hours unit) of the current duration setting in accordance with the rotational movement and the selection of the first portion of the digital representation (e.g., because the first portion of the digital representation is selected, the rotational movement optionally changes a first unit (e.g., hours) of the current duration setting, and not a second unit (e.g., minutes) of the current duration setting); and updating the current duration indicator and the first portion of the digital representation to reflect the updated first unit (e.g., hours) of the current duration setting.

In some embodiments, in response to detecting the selection of the first portion of the digital representation, the electronic device displays a first visual cue indicating the selection of the first portion of the digital representation (e.g., highlighting the first portion of the digital representation, displaying a box or outline around the first portion of the digital representation, causing the first portion of the digital representation to flash, etc.).

In some embodiments, the digital representation comprises a first portion (e.g., an hours indicator) and a second portion (e.g., a minutes indicator). The electronic device optionally detects selection of the second portion of the digital representation (e.g., a user optionally selects/touches the minutes indicator of the digital representation on a touch-sensitive display). The electronic device optionally detects a second rotational movement of the rotatable input mechanism. In response to the second rotational movement, the electronic device optionally updates a second unit (e.g., minutes) of the current duration setting, different from the first unit, in accordance with the second rotational movement and the selection of the second portion of the digital representation (e.g., because the second portion of the digital representation is selected, the rotational movement optionally changes the second unit (e.g., minutes) of the current duration setting, and not the first unit (e.g., hours) of the current duration setting), and updates the current duration indicator and the second portion of the digital representation to reflect the updated second unit (e.g., minutes) of the current duration setting. In some embodiments, in response to detecting the selection of the second portion of the digital representation, the electronic device displays a second visual cue indicating the selection of the second portion of the digital representation (e.g., highlighting the second portion of the digital representation, displaying a box or outline around the second portion of the digital representation, causing the second portion of the digital representation to flash, etc.).

In some embodiments, in response to detecting the selection of the first portion (e.g., the hours portion) of the digital representation, the electronic device updates the analog representation to have a first predefined timescale corresponding to the first unit (e.g., hours) of the current duration setting (e.g., when the hours portion of the digital representation is selected, the analog representation is optionally updated to have a timescale of 0-12 hours). In some embodiments, in response to detecting the selection of the second portion (e.g., the minutes portion) of the digital representation, the electronic device updates the analog representation to have a second predefined timescale corresponding to the second unit (e.g., minutes) of the current duration setting (e.g., when the minutes portion of the digital representation is selected, the analog representation is optionally updated to have a timescale of 0-60 minutes).

In some embodiments, the current duration indicator is located on a perimeter of the analog representation (e.g., the current duration indicator is optionally a dot or line or other indicator that is located around the outside of a circular analog representation), and updating the current duration indicator comprises updating the location of the current duration indicator along the perimeter of the analog representation (e.g., moving the current duration indicator around the outside of the circular analog in accordance with the rotational movement of the rotatable input mechanism). In some embodiments, the current duration indicator comprises a dot. In some embodiments, the current duration indicator comprises a region extending from a first location along a perimeter of the analog representation (e.g., an analog dial location corresponding to 0 hours and/or 0 minutes) to a second location along the perimeter of the analog representation (e.g., an analog dial location corresponding to the hours and/or minutes of the current duration setting), the first location corresponding to a duration setting of zero, and the second location corresponding to the current duration setting. For example, the current duration indicator is optionally a filled region that follows the perimeter/curve of an analog dial, and whose length is determined based on the length of the current duration setting and the units displayed on the analog dial. For example, if the analog dial has a timescale of 0-12 hours, and the hours unit of the current duration setting is 4 hours, the current duration indicator is optionally a filled region extending from 0 hours to 4 hours around the perimeter of the analog dial.

Figure 12:
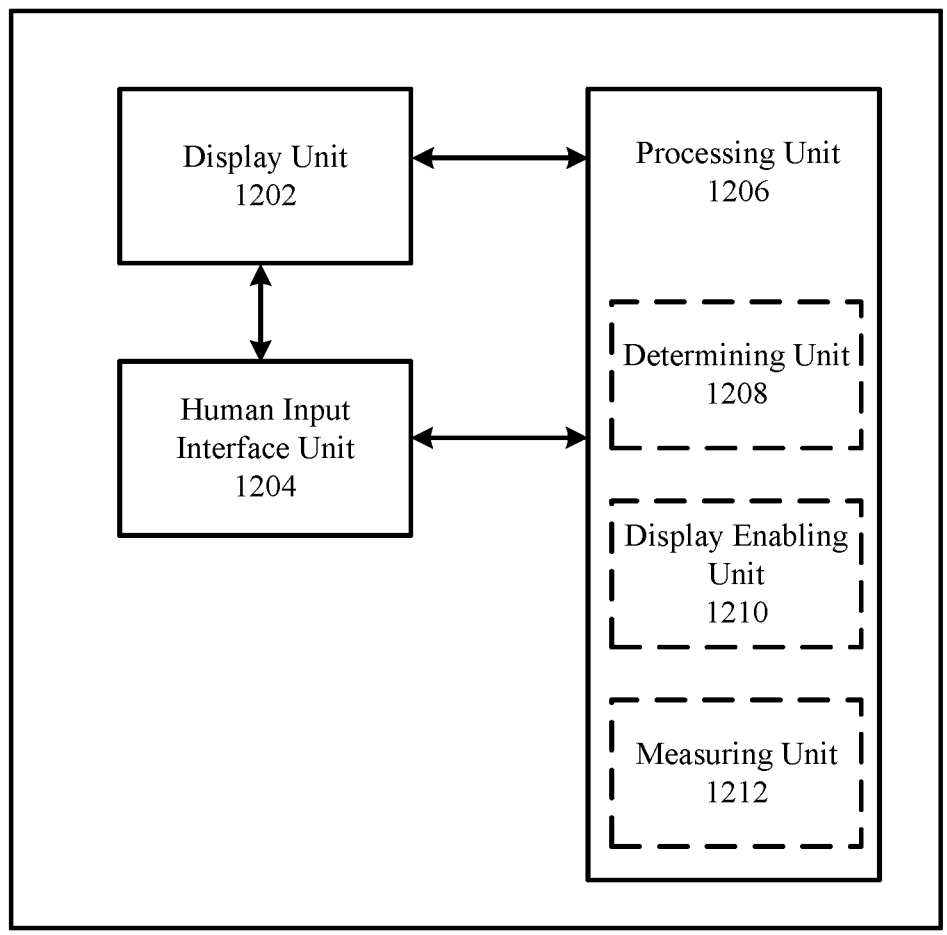
FIG. 12 is a functional block diagram of an electronic device in accordance with some embodiments.

FIG. 12 shows exemplary functional blocks of an electronic device 1200 that, in some embodiments, performs the above-described features. As shown in FIG. 12, an electronic device 1200 may include display unit 1202 configured to display graphical objects; human input interface unit 1204 configured to receive user input; and processing unit 1206 coupled to display unit 1202, and human input interface unit 1204.

In some embodiments, the processing unit 1206 includes a display enabling unit 1210 and a measuring unit 1212. In some embodiments, the display enabling unit 1210 is configured to cause a display of a user interface (or portions of a user interface) in conjunction with the display unit 1202. For example, the display enabling unit 1210 may be used for: displaying, at a first time, a first representation of a first lap time in a user interface; displaying a first representation of a current lap time, the first representation having a first timescale and including a first element, the first element positioned with respect to the first timescale in accordance with the current lap time on the first timescale; updating the first representation of the current lap time to have a second timescale, different from the first timescale, in accordance with a rotational movement of a rotatable input mechanism; and, displaying a timer representation in a user interface.

In some embodiments, the determining unit 1208 is configured to determine various quantities. For example, determining unit 1208 may determine an average lap time based on a first lap time and a second lap time. Determining unit 1208 may also determine a timescale having a maximum lap time greater than a specified lap time. Determining unit 1208 may determine which of a plurality of predefined timescales is closest to an input timescale. In some embodiments, the measuring unit 1212 is configured to measure various quantities. For example, measuring unit 1212 may measure an amount of time that has elapsed since a specified time.

The units of FIG. 12 may be used to implement the various techniques and methods described above with respect to FIGS. 6-11. The units of device 1200 are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

Figure 13:
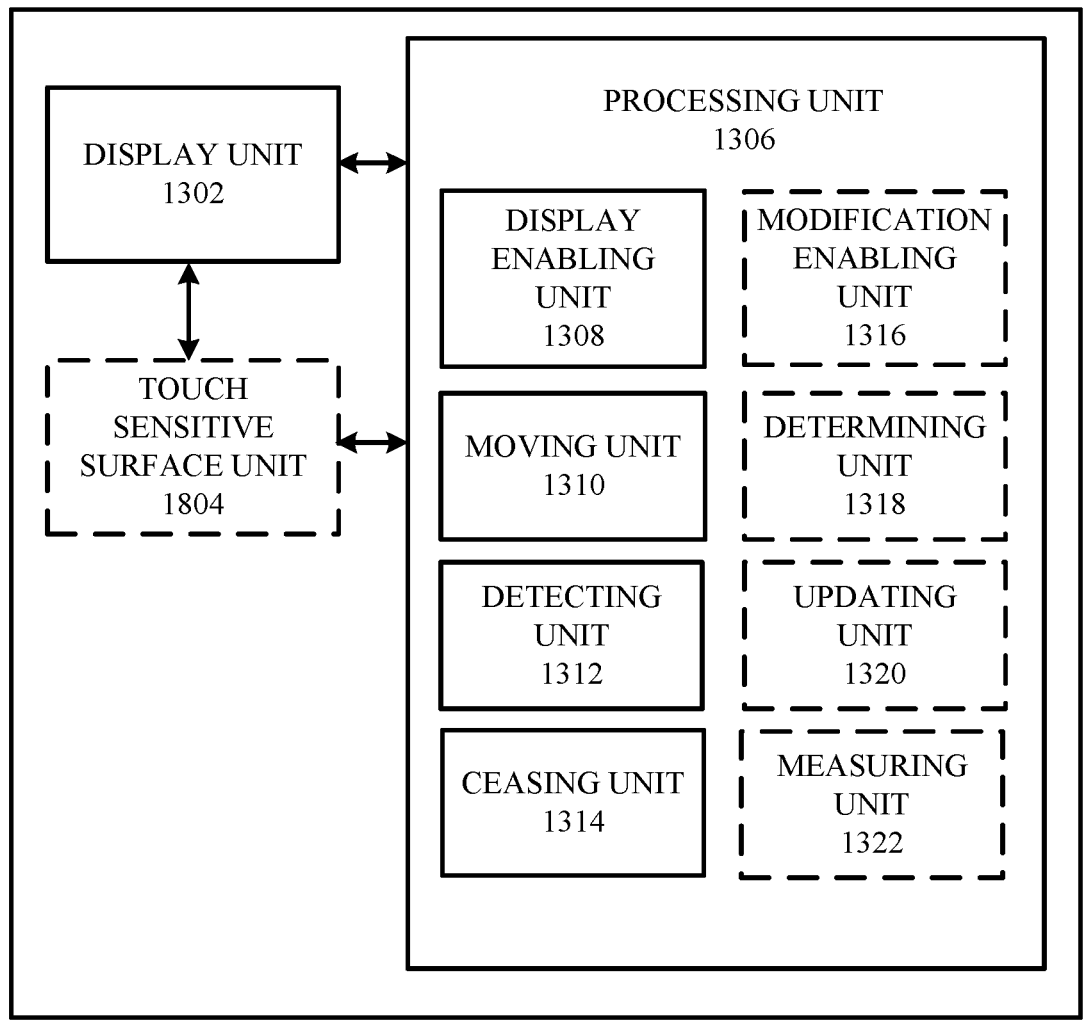
FIG. 13 is a functional block diagram of an electronic device in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a graphic user interface, optionally, a touch sensitive surface unit 1304 configured to receive contacts, and a processing unit 1306 coupled to the display unit 1302 and, optionally, the touch-sensitive surface unit 1304. In some embodiments, the processing unit 1306 includes a display enabling unit 1308, a moving unit 1310, a detecting unit 1312, a ceasing unit 1314, a modification enabling unit 1316, a determining unit 1318, an updating unit 1320, and a measuring unit 1322.

The processing unit 1306 is configured to enable display (e.g., with the display enabling unit 1308), at a first time, a first representation of a first lap time in a user interface; move (e.g., with the moving unit 1310) the first representation along a first axis in the user interface in accordance with a first amount of time elapsed since the first time, the first amount of time corresponding to the first lap time; while moving the first representation, detect (e.g., with the detecting unit 1312) a first lap input at the device at a second time; in response to the first lap input: cease (e.g., with the ceasing unit 1314) movement of the first representation along the first axis; and enable display (e.g., with the display enabling unit 1308) of a second representation of a second lap time in the user interface; and move (e.g., with the moving unit 1310) the second representation along the first axis in the user interface in accordance with a second amount of time elapsed since the second time, the second amount of time corresponding to the second lap time, wherein a relative positioning of the first representation and the second representation along the first axis corresponds to a difference between the first lap time and the second lap time.

In some embodiments, the first and second representations are separated by a distance in a direction orthogonal to the first axis in the user interface.

In some embodiments, the first and second representations are connected by a line in the user interface.

In some embodiments, the first and second representations comprise a first stopwatch view, the processing unit further configured to: detect (e.g., with the detecting unit 1312) a view change input at the device; and in response to the view change input, enable display (e.g., with the display enabling unit 1308) of a second stopwatch view, different from the first stopwatch view, the second stopwatch view including information about the first lap time and the second lap time.

In some embodiments, the processing unit is further configured to: detect (e.g., with the detecting unit 1312) a lap time display input on the touch-sensitive surface unit 1304, the lap time display input comprising a contact and movement of the contact on the touch-sensitive surface unit 1304; and in response to the lap time display input, enable display (e.g., with the display enabling unit 1308) of a list of lap times including the first lap time and the second lap time.

In some embodiments, the processing unit is further configured to: in response to the lap time display input, enable modification (e.g., with the modification enabling unit 1316) of the first and second representations so as to reduce a display area of the first and second representations in the user interface.

In some embodiments, a first dimension of the user interface along the first axis is displayed at a first timescale, the first timescale having a first maximum lap time, and the second lap time exceeds the first maximum lap time, the processing unit further configured to: while the second lap time exceeds the first maximum lap time, detect (e.g., with the detecting unit 1312) a second lap input at the device at a third time; and in response to the second lap input: determine (e.g., with the determining unit 1318) a second timescale having a second maximum lap time greater than the second lap time; and update (e.g., with the updating unit 1320) the first dimension of the user interface to have the second timescale.

In some embodiments, the first representation and the second representation provide respective visual cues of their respective lap times.

In some embodiments, the processing unit is further configured to: enable display (e.g., with the display enabling unit 1308) of a stopwatch representation in addition to the first representation and the second representation, the stopwatch representation including information about the second lap time.

In some embodiments, the processing unit is further configured to: detect (e.g., with the detecting unit 1312) a second lap input at the device at a third time, the third time being after the second time; in response to the second lap input, determine (e.g., with the determining unit 1318) an average lap time based on the first lap time and the second lap time; and enable display (e.g., with the display enabling unit 1308) of a representation of the average lap time in the user interface.

In some embodiments, the processing unit is further configured to: prior to moving the first representation along the first axis in the user interface, measure (e.g., with the measuring unit 1322) the first amount of time elapsed since the first time, wherein moving the first representation along the first axis is in accordance with the measured first amount of time; and prior to moving the second representation along the first axis in the user interface, measure (e.g., with the measuring unit 1322) the second amount of time elapsed since the second time, wherein moving the second representation along the first axis is in accordance with the measured second amount of time.

The operations described above with reference to FIG. 9A-9B are, optionally, implemented by components depicted in FIGS. 1A-1B or FIG. 13. For example, the displaying operation 902, moving operations 904 and 912, detecting operation 906, and ceasing operation 910, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
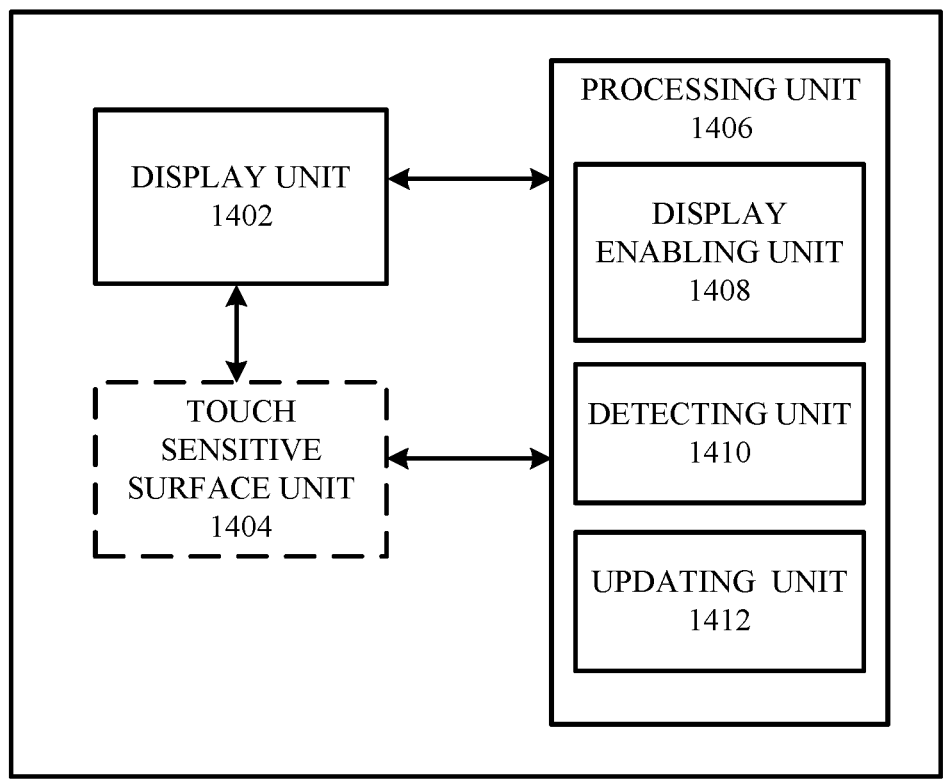
FIG. 14 is a functional block diagram of an electronic device in accordance with some embodiments.

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a graphic user interface, optionally, a touch sensitive surface unit 1404 configured to receive contacts, and a processing unit 1406 coupled to the display unit 1402 and, optionally, the touch-sensitive surface unit 1404. In some embodiments, the processing unit 1406 includes a display enabling unit 1408, a detecting unit 1410, and an updating unit 1412.

The processing unit 1406 is configured to enable display (e.g., with the display enabling unit 1408) of a first representation of a current lap time in a user interface, the first representation having a first timescale and including a first element, the first element positioned with respect to the first timescale in accordance with the current lap time on the first timescale; while enabling display of the first representation, detect (e.g., with the detecting unit 1410) a rotational movement of a rotatable input mechanism of the electronic device; and in response to the rotational movement: update (e.g., with the updating unit 1412) the first representation of the current lap time to have a second timescale, different from the first timescale, in accordance with the rotational movement and update (e.g., with the updating unit 1412) the position of the first element in accordance with the current lap time on the second timescale.

In some embodiments, updating the first representation to have the second timescale comprises selecting the second timescale from a plurality of predefined timescales.

In some embodiments, the rotational movement of the rotatable input mechanism corresponds to a first input timescale, different from each of the plurality of predefined timescales, and selecting the second timescale from the plurality of predefined timescales comprises: determining which of the plurality of predefined timescales is closest to the first input timescale and selecting the closest timescale of the predefined timescales as the second timescale.

In some embodiments, updating the first representation comprises enabling display of an animation of the first representation changing from the first timescale to the second timescale.

In some embodiments, the first representation of the current lap time includes a second representation of the current lap time, the second representation having a third timescale, different from the first timescale, the processing unit further configured to: in response to the rotational movement, update (e.g., with the updating unit 1412) the second representation of the current lap time to have a fourth timescale, different from the second timescale, in accordance with the rotational movement.

The operations described above with reference to FIG. 10 are, optionally, implemented by components depicted in FIGS. 1A-1B or FIG. 14. For example, display operation 1002, detecting operation 1004, and updating operation 1008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective pre-defined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
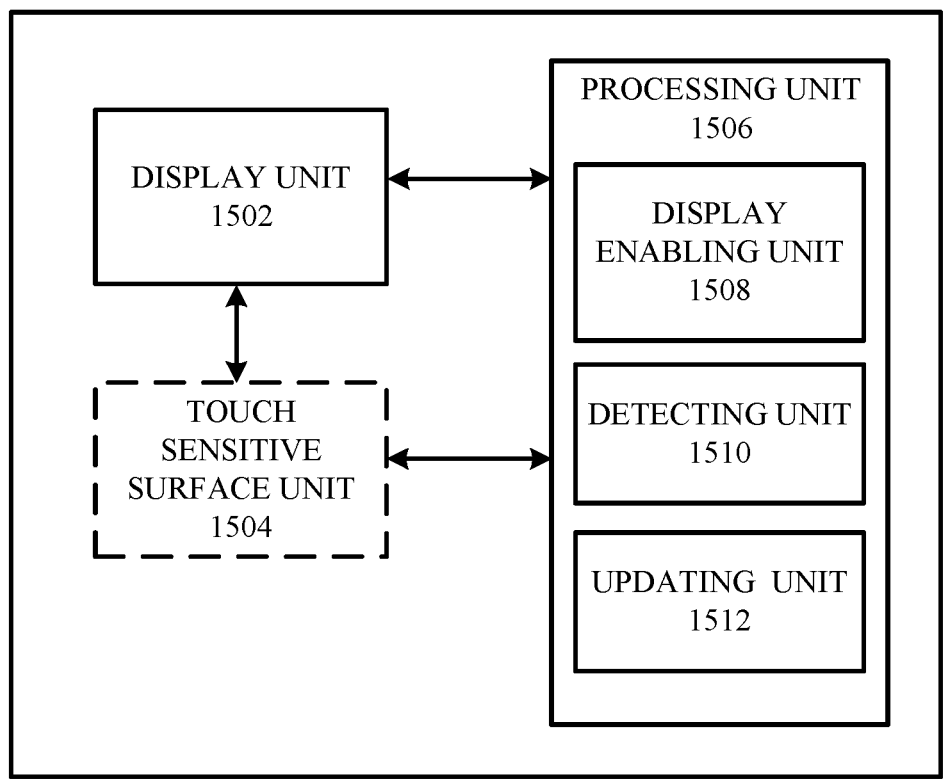
FIG. 15 is a functional block diagram of an electronic device in accordance with some embodiments.

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display a graphic user interface, optionally, a touch sensitive surface unit 1504 configured to receive contacts, and a processing unit 1506 coupled to the display unit 1502 and, optionally, the touch-sensitive surface unit 1504. In some embodiments, the processing unit 1506 includes a display enabling unit 1508, a detecting unit 1510, and an updating unit 1512.

The processing unit 1506 is configured to enable display (e.g., with the display enabling unit 1508) of a timer representation in a user interface, the timer representation including: an analog representation, the analog representation including a current duration indicator representing a current duration setting, and a digital representation representing the current duration setting; while enabling display of the timer representation, detect (e.g., with the detecting unit 1510) a rotational movement of a rotatable input mechanism; and in response to the rotational movement, update (e.g., with the updating unit 1512) the current duration indicator and the digital representation in accordance with the rotational movement.

In some embodiments, the digital representation comprises a first portion and a second portion, the processing unit further configured to, prior to detecting the rotational movement of the rotatable input mechanism, detect (e.g., with the detecting unit 1510) selection of the first portion of the digital representation, where updating the current duration indicator and the digital representation comprises updating a first unit of the current duration setting in accordance with the rotational movement and the selection of the first portion of the digital representation and updating the current duration indicator and the first portion of the digital representation to reflect the updated first unit of the current duration setting.

In some embodiments, the processing unit is further configured to, in response to detecting the selection of the first portion of the digital representation, enable display (e.g., with the display enabling unit 1508) of a first visual cue indicating the selection of the first portion of the digital representation.

In some embodiments, the digital representation comprises a first portion and a second portion, the processing unit further configured to detect (e.g., with the detecting unit 1510) selection of the second portion of the digital representation, detect (e.g., with the detecting unit 1510) a second rotational movement of the rotatable input mechanism, and in response to the second rotational movement: update (e.g., with the updating unit 1512) a second unit of the current duration setting, different from the first unit, in accordance with the second rotational movement and the selection of the second portion of the digital representation and update (e.g., with the updating unit 1512) the current duration indicator and the second portion of the digital representation to reflect the updated second unit of the current duration setting.

In some embodiments, the processing unit is further configured to, in response to detecting the selection of the second portion of the digital representation, enable display (e.g., with the display enabling unit 1508) of a second visual cue indicating the selection of the second portion of the digital representation.

In some embodiments, the processing unit is further configured to, in response to detecting the selection of the first portion of the digital representation, update (e.g., with the updating unit 1512) the analog representation to have a first predefined timescale corresponding to the first unit of the current duration setting.

In some embodiments, the processing unit is further configured to, in response to detecting the selection of the second portion of the digital representation, update the analog representation to have a second predefined timescale corresponding to the second unit of the current duration setting.

In some embodiments, the current duration indicator is located on a perimeter of the analog representation, and updating the current duration indicator comprises updating the location of the current duration indicator along the perimeter of the analog representation.

In some embodiments, the current duration indicator comprises a dot.

In some embodiments, the current duration indicator comprises a region extending from a first location along a perimeter of the analog representation to a second location along the perimeter of the analog representation, the first location corresponding to a duration setting of zero, and the second location corresponding to the current duration setting.

The operations described above with reference to FIG. 11 are, optionally, implemented by components depicted in FIGS. 1A-1B or FIG. 15. For example, display operation 1102, detecting operation 1106, and updating operation 1108 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
   a display;
   one or more processors;
   one or more input devices;
   a memory; and
   one or more programs, wherein the one or more programs are stored in memory configured to be executed by the one or more processors, the one or more programs including instructions for:
      displaying, on the display:
         a user interface that has an appearance based on a current setting for a parameter;
         a first indicator indicating a first setting of a plurality of settings for the parameter; and
         a second indicator at a first rotational position relative to the user interface that corresponds to the first setting of the plurality of settings for the parameter, wherein the second indicator is different from the first indicator;
      detecting, via the one or more input devices, an input; and
      in response to detecting the input:
         updating the first indicator to indicate a second setting of the plurality of settings for the parameter, wherein the second setting is different from the first setting; and
         updating the rotational position of the second indicator from the first rotational position to a second rotational position, wherein the second indicator at the second rotational position corresponds to the second setting of the plurality of settings for the parameter.

2. The electronic device of claim 1, wherein the parameter includes a time-based parameter.

3. The electronic device of claim 2, wherein the first indicator includes a textual representation of a setting for the time-based parameter.

4. The electronic device of claim 1, wherein the user interface includes an analog representation of time with timescale indicators positioned around the analog representation.

5. The electronic device of claim 4, wherein the second indicator includes a region outside the analog representation of time.

6. The electronic device of claim 1, wherein the one or more input devices include a rotatable input mechanism and detecting the input includes detecting rotation of the rotatable input mechanism.

7. The electronic device of claim 1, the one or more programs further include instructions for:
   detecting, via the one or more input devices, a second input; and
   in response to detecting the second input, updating the user interface from the appearance based on the current setting for a parameter to a second appearance.

8. The electronic device of claim 7, wherein the second input includes a touch input on the display.

9. The electronic device of claim 7, wherein the one or more programs further include instructions for:
   while displaying the user interface with the second appearance, detecting, via the one or more input devices, a third input; and
   in response to detecting the third input:
      updating the first indicator to indicate a third setting of the plurality of settings for the parameter, wherein the third setting is different from the first setting; and
      updating the rotational position of the second indicator from the first rotational position to a third rotational position, wherein the second indicator at the third rotational position corresponds to the third setting of the plurality of settings for the parameter.

10. The electronic device of claim 9, wherein detecting the third input includes detecting rotation of a rotatable input mechanism.

11. A non-transitory computer-readable storage medium storing one or more programs configured to be executed by one or more processors of an electronic device with a display and one or more input devices, the one or more programs including instructions for:
   displaying, on the display:
      a user interface that has an appearance based on a current setting for a parameter;
      a first indicator indicating a first setting of a plurality of settings for the parameter; and
      a second indicator at a first rotational position relative to the user interface that corresponds to the first setting of the plurality of settings for the parameter, wherein the second indicator is different from the first indicator;
   detecting, via the one or more input devices, an input; and
   in response to detecting the input:
      updating the first indicator to indicate a second setting of the plurality of settings for the parameter, wherein the second setting is different from the first setting; and
      updating the rotational position of the second indicator from the first rotational position to a second rotational position, wherein the second indicator at the second rotational position corresponds to the second setting of the plurality of settings for the parameter.

12. A method, comprising:
at an electronic device with a display and one or more input devices;
displaying, on the display:
a user interface that has an appearance based on a current setting for a parameter;
a first indicator indicating a first setting of a plurality of settings for the parameter; and
a second indicator at a first rotational position relative to the user interface that corresponds to the first setting of the plurality of settings for the parameter, wherein the second indicator is different from the first indicator;
detecting, via the one or more input devices, an input; and
in response to detecting the input:
updating the first indicator to indicate a second setting of the plurality of settings for the parameter, wherein the second setting is different from the first setting; and
updating the rotational position of the second indicator from the first rotational position to a second rotational position, wherein the second indicator at the second rotational position corresponds to the second setting of the plurality of settings for the parameter.

13. The non-transitory computer-readable storage medium of claim 11, wherein the parameter includes a time-based parameter.

14. The non-transitory computer-readable storage medium of claim 13, wherein the first indicator includes a textual representation of a setting for the time-based parameter.

15. The non-transitory computer-readable storage medium of claim 11, wherein the user interface includes an analog representation of time with timescale indicators positioned around the analog representation.

16. The non-transitory computer-readable storage medium of claim 15, wherein the second indicator includes a region outside the analog representation of time.

17. The non-transitory computer-readable storage medium of claim 11, wherein the one or more input devices include a rotatable input mechanism and detecting the input includes detecting rotation of the rotatable input mechanism.

18. The non-transitory computer-readable storage medium of claim 11, the one or more programs further include instructions for:
detecting, via the one or more input devices, a second input; and
in response to detecting the second input, updating the user interface from the appearance based on the current setting for a parameter to a second appearance.

19. The non-transitory computer-readable storage medium of claim 18, wherein the second input includes a touch input on the display.

20. The non-transitory computer-readable storage medium of claim 18, wherein the one or more programs further include instructions for:
while displaying the user interface with the second appearance, detecting, via the one or more input devices, a third input; and
in response to detecting the third input:
updating the first indicator to indicate a third setting of the plurality of settings for the parameter, wherein the third setting is different from the first setting; and
updating the rotational position of the second indicator from the first rotational position to a third rotational position, wherein the second indicator at the third rotational position corresponds to the third setting of the plurality of settings for the parameter.

21. The non-transitory computer-readable storage medium of claim 20, wherein detecting the third input includes detecting rotation of a rotatable input mechanism.

22. The method of claim 12, wherein the parameter includes a time-based parameter.

23. The method of claim 22, wherein the first indicator includes a textual representation of a setting for the time-based parameter.

24. The method of claim 12, wherein the user interface includes an analog representation of time with timescale indicators positioned around the analog representation.

25. The method of claim 24, wherein the second indicator includes a region outside the analog representation of time.

26. The method of claim 12, wherein the one or more input devices include a rotatable input mechanism and detecting the input includes detecting rotation of the rotatable input mechanism.

27. The method of claim 12, further comprising:
detecting, via the one or more input devices, a second input; and
in response to detecting the second input, updating the user interface from the appearance based on the current setting for a parameter to a second appearance.

28. The method of claim 27, wherein the second input includes a touch input on the display.

29. The method of claim 27, further comprising:
while displaying the user interface with the second appearance, detecting, via the one or more input devices, a third input; and
in response to detecting the third input:
updating the first indicator to indicate a third setting of the plurality of settings for the parameter, wherein the third setting is different from the first setting; and
updating the rotational position of the second indicator from the first rotational position to a third rotational position, wherein the second indicator at the third rotational position corresponds to the third setting of the plurality of settings for the parameter.

30. The method of claim 29, wherein detecting the third input includes detecting rotation of a rotatable input mechanism.

* * * * *